US010253890B2

(12) United States Patent
Ohshio et al.

(10) Patent No.: US 10,253,890 B2
(45) Date of Patent: Apr. 9, 2019

(54) SERVO-VALVE AND FLUIDIC DEVICE

(71) Applicant: NABTESCO CORPORATION, Tokyo (JP)

(72) Inventors: Keitaroh Ohshio, Gifu-ken (JP); Yu Shibata, Gifu-ken (JP); Satoshi Asada, Gifu-ken (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 15/633,364

(22) Filed: Jun. 26, 2017

(65) Prior Publication Data
US 2017/0370484 A1 Dec. 28, 2017

(30) Foreign Application Priority Data

Jun. 27, 2016 (JP) ................................. 2016-126963
Jun. 5, 2017 (JP) ................................. 2017-111224

(51) Int. Cl.
*F16K 31/124* (2006.01)
*F16K 11/065* (2006.01)
*F16K 31/42* (2006.01)
*F15B 13/043* (2006.01)
*F15C 3/12* (2006.01)

(52) U.S. Cl.
CPC ........ *F16K 11/065* (2013.01); *F15B 13/0436* (2013.01); *F15C 3/12* (2013.01); *F16K 31/423* (2013.01)

(58) Field of Classification Search
CPC .............................. F16K 11/065; F16K 31/423
USPC .......................................... 137/487.5, 83, 85
See application file for complete search history.

(56) References Cited

U.S. PATENT DOCUMENTS 2,873,755 A * 2/1959 Whitehead, Jr. ...... G05D 23/185
  137/82
2,884,907 A * 5/1959 Atchley .............. F15B 13/0436
  137/48
3,223,103 A * 12/1965 Trinkler .................... F15B 9/06
  137/83

(Continued)

FOREIGN PATENT DOCUMENTS

EP    0662565 A1   7/1995
JP    H0434501 U   3/1992

OTHER PUBLICATIONS

Extended European Search Report corresponding to Application No. 17177985.3-1754, dated Dec. 4, 2017.

*Primary Examiner* — Minh Le
(74) *Attorney, Agent, or Firm* — Cantor Colburn LLP

(57) ABSTRACT

Servo-valve that drives an actuator by using a fluid. The servo-valve includes a nozzle having a discharge edge forming an outline of a discharge port from which the fluid is discharged and a tapered inner wall growing narrower toward the discharge edge, and a receiver that is provided with a flow path into which the fluid discharged from the discharge port flows. The nozzle is displaced in a direction different from the fluid discharge direction. The flow path extension direction is inclined with respect to a direction orthogonal to an inflow surface facing the nozzle by an angle α. A taper angle determined by the tapered inner wall is larger than twice the angle α. With such a configuration, the component of flow force exerted from the fluid on the tapered inner wall decreases. Since the nozzle can be quickly displaced, response speed of the actuator is improved.

12 Claims, 15 Drawing Sheets

(56) References Cited

U.S. PATENT DOCUMENTS

| | | | | |
|---|---|---|---|---|
| 3,386,343 A | * | 6/1968 | Gray | F15B 9/00 137/83 |
| 3,538,936 A | * | 11/1970 | Cooper | F15C 3/12 137/83 |
| 3,542,051 A | * | 11/1970 | McFadden | F15B 13/0436 137/625.63 |
| 3,612,103 A | * | 10/1971 | Waddington | F15B 13/0436 137/625.63 |
| 4,442,855 A | * | 4/1984 | Hoffman, Jr. | F15C 3/10 137/83 |

* cited by examiner

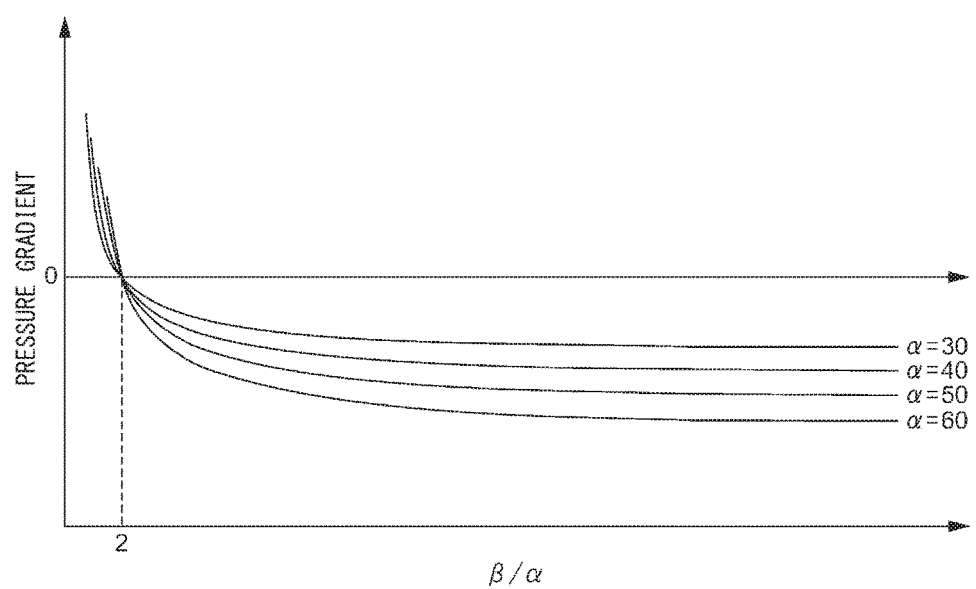

SERVO-VALVE AND FLUIDIC DEVICE

RELATED APPLICATIONS

This application is based upon and claims the benefit of priority from the prior Japanese Patent Application No. 2016-126963, filed on Jun. 27, 2016 and the prior Japanese Patent Application No. 2017-111224, filed on Jun. 5, 2017, the entire content of each of which is incorporated herein by reference.

BACKGROUND OF THE INVENTION

1. Field of the Invention

The present invention relates to a servo-valve and a fluidic device having a high response performance.

2. Description of the Related Art

A servo-valve is used in airplanes or other industrial fields. U.S. Pat. No. 2,884,907 discloses a technique of displacing a nozzle toward left and right sides of a rotation axis based on an electromagnetic principle to adjust the amount of hydraulic oil flowing into two inflow ports formed in a receiver.

A high response speed of the servo-valve results in a high accuracy of a control using the servo-valve. Thus, there have been various attempts for improving a mechanical mechanism and/or an electrical mechanism for driving the nozzle from the past. However, many of these improvements face various problems involving with a selection of a material, a mechanical strength, a complex control, and a manufacturing cost of the servo-valve.

SUMMARY OF THE INVENTION

An object of the invention is to provide a simple technique of giving a high response speed to a servo-valve.

A servo-valve according to an aspect of the invention drives an actuator by using a fluid. The servo-valve includes a nozzle that includes: a discharge edge forming an outline of a discharge port from which the fluid is discharged and a tapered inner wall growing narrower toward the discharge edge; and a receiver that is provided with a flow path into which the fluid discharged from the discharge port flows. The nozzle is displaced in a direction different from the fluid discharge direction. The flow path extension direction is inclined with respect to a direction orthogonal to an inflow surface facing the nozzle by an angle α. A taper angle determined by the tapered inner wall is larger than twice the angle α.

According to the above-described configuration, since the taper angle determined by the tapered inner wall is larger than twice the angle α, a component of a force (also referred to as a "flow force") exerted from the fluid to the tapered inner wall in the nozzle displacement direction decreases. The nozzle is hardly affected by the fluid and displaced promptly and so allows prompt switching of hydraulic fluid. As a result, the servo-valve is operated at a high response speed to quickly drive an actuator.

A servo-valve according to another aspect of the invention is a servo-valve that drives an actuator by using a fluid, including: a nozzle that includes a discharge edge forming an outline of a discharge port from which the fluid is discharged and a tapered inner wall growing narrower toward the discharge edge; a receiver that includes an inflow surface provided with a first inflow port into which a part of the fluid discharged from the discharge port flows and a second inflow port into which the rest of the fluid discharged from the discharge port flows; and a driving unit that drives the nozzle along an alignment line on which the first inflow port and the second inflow port are aligned. The driving unit drives the nozzle to displace the nozzle on the alignment line from a neutral position in which an extended line extended in the fluid discharge direction from the center of the discharge port intersects the alignment line between the first inflow port and the second inflow port. The tapered inner wall and a virtual plane enclosing the extended line and the alignment line form a first straight line of intersection and a second straight line of intersection. When the nozzle is positioned at the neutral position, the extended line of the first line of intersection extends inside the first inflow port and the extended line of the second line of intersection extends inside the second inflow port.

According to the above-described configuration, since the extended line of the first line of intersection extends inside the first inflow port and the extended line of the second line of intersection extends inside the second inflow port when the nozzle is positioned at the neutral position, the taper angle of the tapered inner wall increases. Thus, a component of the flow force exerted from the fluid to the tapered inner wall in the direction along the alignment line decreases. Since nozzle is hardly affected by the fluid and displaced promptly, the servo-valve is operated at a high response speed to quickly drive an actuator.

A fluidic device according to still another aspect of the invention includes: the above-described servo-valve; and a movable piece that is displaced by the fluid inside a hollow portion communicating with the first outflow port and the second outflow port.

According to the above-described configuration, the fluidic device including the servo-valve can be operated at a high response speed.

BRIEF DESCRIPTION OF THE DRAWINGS

FIG. 12 is a diagram illustrating a relation among a pressure gradient of a hydraulic fluid, an inclination angle α of a flow path, and a taper angle β of a nozzle.

DETAILED DESCRIPTION OF THE INVENTION

The invention will now be described by reference to the preferred embodiments. This does not intend to limit the scope of the present invention, but to exemplify the invention.

First Embodiment

In a known servo-valve, a nozzle is designed so that a front end thereof turns (swings) (hereinafter, referred to as "oscillation movement" or "oscillation") in both directions with a predetermined angle range about a rotation axis. The inventors have found a problem in which a hydraulic fluid discharged from a nozzle acts as a drag given to an inner wall surface of the nozzle on the horizontal oscillation movement. Since a large drag on the oscillation movement inhibits a movement switching the flow of the hydraulic fluid, the response performance of a servo-valve and an actuator coupled to the servo-valve are degraded. In the first embodiment, an illustrative servo-valve capable of reducing a drag on the oscillation movement of the nozzle will be described.

Figure 1:
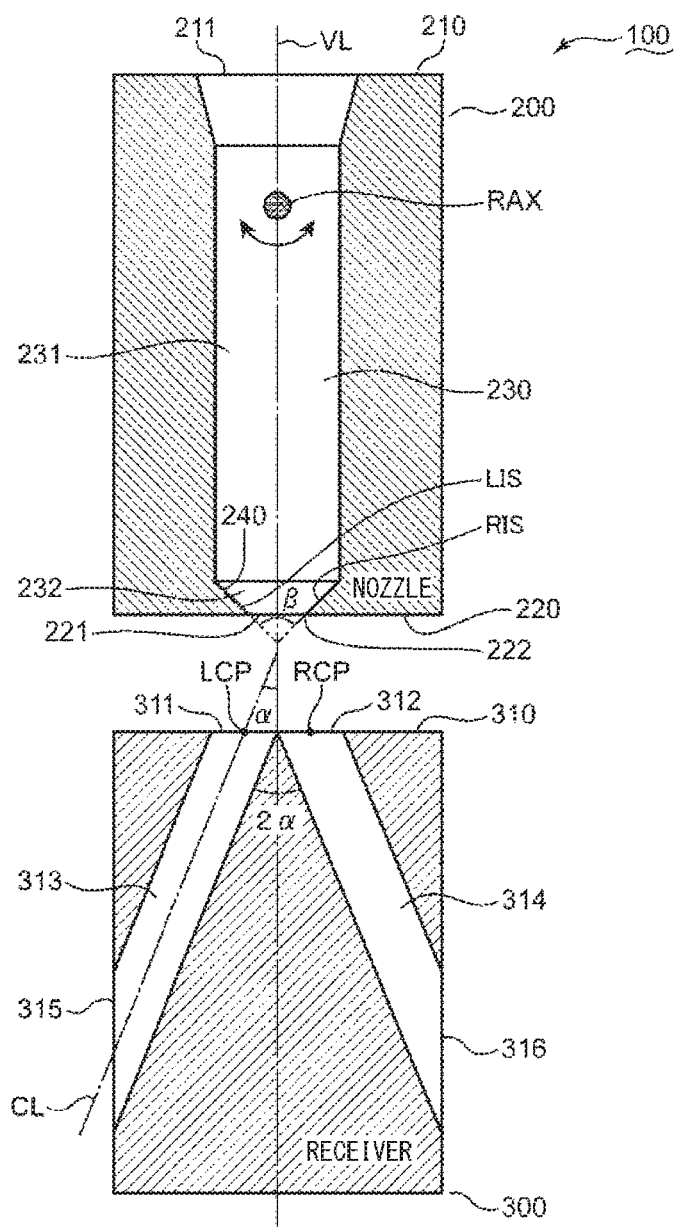
FIG. 1 is a conceptual diagram showing a servo-valve of a first embodiment.

FIG. 1 is a conceptual diagram showing a servo-valve 100 of a first embodiment. The servo-valve 100 will be described with reference to FIG. 1. Terms like "upward," "downward," "leftward," "rightward," "clockwise," "counterclockwise," "vertical," and "horizontal" indicating directions are used merely for the purpose of making the explanation unambiguous. The principle of the embodiments is not by any means limited by these terms denoting the directions.

The servo-valve 100 includes a nozzle 200 and a receiver 300. The nozzle 200 can be oscillated clockwise and counterclockwise about a rotation axis RAX defined on an upper portion of the nozzle 200. The nozzle 200 shown in FIG. 1 is positioned at a "neutral position." At the neutral position, a center line of the nozzle 200 matches a vertical line VL.

The nozzle 200 includes an upper surface 210 and a lower surface 220. The lower surface 220 faces the receiver 300. The upper surface 210 is located above the lower surface 220. The upper surface 210 is provided with an inflow port 211. The inflow port 211 is connected to a pump or other fluid supply sources supplying a hydraulic fluid. The hydraulic fluid (which will be referred to as, for example, hydraulic oil, but may be simply referred to as a "fluid" on the condition that the invention is not limited thereto) flows into the nozzle 200 through the inflow port 211.

The lower surface 220 (the front end surface) is provided with a discharge port 221 from which the hydraulic fluid flowing from the inflow port 211 is discharged. The center line of the nozzle 200 may be defined as a line which passes through the center of the inflow port 211 and the center of the discharge port 221.

The lower surface 220 includes a discharge edge 222 which forms the outline of the discharge port 221. The discharge edge 222 may draw a circular outline or a non-circular outline. The principle of the embodiment is not limited to a specific outline form drawn by the discharge edge 222.

The nozzle 200 is provided with a nozzle flow path 230 which extends downward from the inflow port 211 and is coupled to the discharge port 221. The nozzle flow path 230 includes a straight run of pipe 231 and a tapered pipe portion 232 which extends downward from the straight run of pipe 231. The straight run of pipe 231 extends along the center line of the nozzle 200 at the substantially uniform cross-sectional area. The tapered pipe portion 232 grows narrower toward the discharge edge 222. The hydraulic fluid discharge pressure can be increased by the tapered pipe portion 232. The high-pressure hydraulic fluid is discharged from the discharge port 221. When the nozzle 200 is at the neutral position, the hydraulic fluid discharge direction from the discharge port 221 substantially matches the extension direction of the vertical line VL. When the nozzle 200 is oscillated clockwise, the hydraulic fluid is discharged toward lower left from the discharge port 221. When the nozzle 200 is oscillated counterclockwise, the hydraulic fluid is discharged toward lower right from the discharge port 221. In the embodiment, the first direction is exemplified by the hydraulic fluid is discharged toward the neutral position from the discharge port 221.

The nozzle 200 includes a tapered inner wall 240 which forms the outline of the tapered pipe portion 232. The discharge edge 222 is positioned at a boundary between the tapered inner wall 240 and the lower surface 220.

The receiver 300 includes an upper surface 310 which faces the lower surface 220 of the nozzle 200. The upper surface 310 is provided with a left inflow port 311 and a right inflow port 312. A left inflow port 311 is positioned to the left of the right inflow port 312. The direction of alignment of the left inflow port 311 and the right inflow port 312 is substantially orthogonal to a direction in which the hydraulic fluid is discharged from the discharge port 221 of the nozzle 200 at the neutral position. The direction of alignment of the left inflow port 311 and the right inflow port 312 matches the movement direction of the discharge port 221 in accordance with the rotation of the nozzle 200 about the rotation axis RAX. In the embodiment, the second direction is exemplified by the direction of alignment of the left inflow port 311 and the right inflow port 312 and/or the movement direction of the discharge port 221 in accordance with the rotation of the nozzle 200 about the rotation axis RAX.

The receiver 300 is provided with a left flow path 313 and a right flow path 314. The left flow path 313 extends leftward and downward from the left inflow port 311 and is terminated at the left outflow port 315. The right flow path 314 extends rightward and downward from the right inflow port 312 and is terminated at the right outflow port 316. The left outflow port 315 and the right outflow port 316 are formed in an outer surface of the receiver 300 and are coupled to a spool valve (not shown) or an actuator (not shown).

When the nozzle 200 is positioned at the neutral position, the hydraulic fluid discharged from the discharge port 221 flow in substantially in the same quantity into the left inflow port 311 and the right inflow port 312. In the embodiment, the first flow path is exemplified by one of the left flow path 313 and the right flow path 314. The second flow path is exemplified by the other of the left flow path 313 and the right flow path 314. The first inflow port is exemplified by one of the left inflow port 311 and the right inflow port 312. The second inflow port is exemplified by the other of the left inflow port 311 and the right inflow port 312. The inflow surface is exemplified by the upper surface of the receiver 300.

FIG. 1 shows the center line CL of the left flow path 313. The extension direction of the center line CL matches the extension direction of the left flow path 313. Further, FIG. 1 shows the inclination angle α (<90°) of the center line CL from the vertical line VL. As described above, since the right flow path 314 has a point-symmetrical relation with respect to the left flow path 313, the inclination angle of the center line (not shown) of the right flow path 314 from the vertical line VL matches the inclination angle α of the left flow path 313. In the embodiment, the extended line is exemplified by the vertical line VL.

FIG. 1 shows a center point LCP of the left inflow port 311 and a center point RCP of the right inflow port 312. A relative positional relation between the nozzle 200 and the receiver 300 is set so that the vertical line VL and the center points LCP and RCP are positioned on the common virtual plane. FIG. 1 conceptually shows the cross-sections of the nozzle 200 and the receiver 300 on the common virtual plane. In the embodiment, the alignment line is exemplified by the line passing through the center points LCP and RCP.

FIG. 1 shows two lines of intersection LIS and RIS formed by the virtual plane and the tapered inner wall 240. The line of intersection LIS is formed at the left of the vertical line VL. The line of intersection RIS is formed at the right of the vertical line VL. Two lines of intersection LIS and RIS are straight lines which have a point-symmetrical relation about the vertical line VL. Further, FIG. 1 shows the taper angle β of the tapered pipe portion 232. The taper angle β may be defined as a narrow angle (the angle of intersection determined by the lines of intersection LIS and RIS) between the extended lines of two lines of intersection LIS and RIS. The taper angle β is determined so that a relation shown in the following expression (1) holds. In the following expression (1), "2α" corresponds to a narrow angle between the left flow path 313 and the right flow path 314. In the embodiment, the first line of intersection is exemplified by one of the lines of intersection LIS and RIS. The second line of intersection is exemplified by the other of the lines of intersection LIS and RIS.

Expression 1

$$\beta > 2\alpha \quad (1)$$

Second Embodiment

An angle relation explained in the first embodiment contributes to the reduction of the drag in the direction of movement of the nozzle. In a second embodiment, the drag reduction principle will be described.

Figure 2:
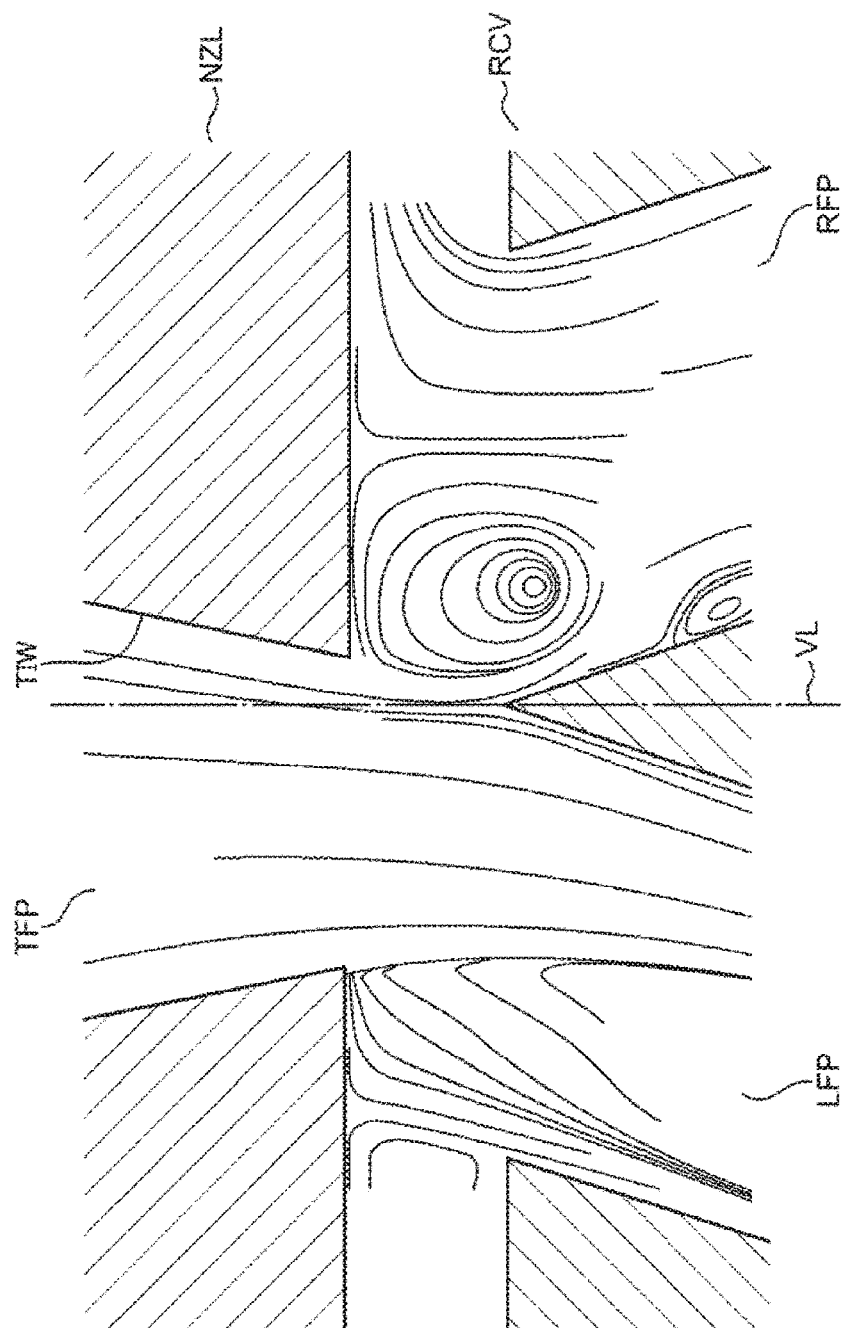
FIG. 2 is flow line data of a known servo-valve (second embodiment).

FIG. 2 shows flow line data in a known servo-valve. Referring to FIG. 2, a flow line generated inside the known servo-valve will be described.

FIG. 2 shows a receiver RCV disposed below the nozzle NZL and the nozzle NZL. In FIG. 2, the left flow path LFP and the right flow path RFP formed in the receiver RCV are drawn. In FIG. 2, the tapered inner wall TIW of the nozzle NZL and the tapered flow path TFP surrounded by the tapered inner wall TIW are further drawn. A plurality of curves which are drawn in the left flow path LFP, the right flow path RFP, the tapered flow path TFP, and the gap formed between the nozzle NZL and the receiver RCV and extended in the horizontal direction indicate the flow lines of the hydraulic fluid.

FIG. 2 shows the vertical line VL passing through the branching point from which the left flow path LFP and the right flow path RFP branch. The nozzle NZL shown in FIG. 2 moves leftward from the neutral position and the hydraulic fluid discharged from the nozzle NZL through the tapered flow path TFP mainly flows into the left flow path LFP. At this time, the flow line of the hydraulic fluid directed from the tapered flow path TFP toward the left flow path LFP is curved left. The left curving of the flow line means the generation of the centrifugal force exerted on the right of the tapered inner wall TIW. The following expression (2) shows a relation between a pressure (a left side) generated by a centrifugal force and a radius of a curved flow line.

Expression 2

$$\frac{\partial p}{\partial r} = \rho \omega^2 r = \rho \frac{v_\theta^2}{r} \quad (2)$$

Figure 3A:
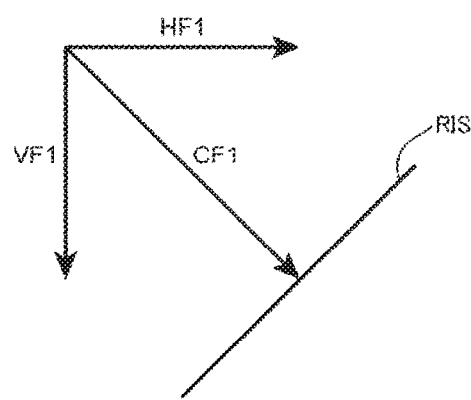
FIG. 3A is a diagram showing a centrifugal force (a flow force) acting on a line of intersection defined on FIG. 1 (second embodiment).
Figure 3B:
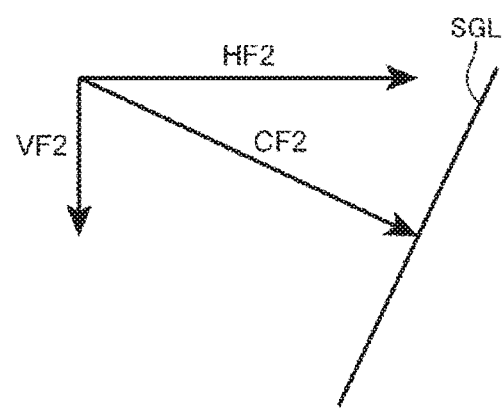
FIG. 3B is a diagram showing a centrifugal force (a flow force) acting on a line having a gradient larger than that of the line of intersection shown in FIG. 3A (second embodiment).

P: pressure of hydraulic fluid
R: radius of flow line of hydraulic fluid
ρ: density of hydraulic fluid
ω: angular velocity of hydraulic fluid
$v_\theta$: kinematic viscosity of hydraulic fluid FIG. 3A shows a centrifugal force CF1 acting on the line of intersection RIS. FIG. 3B shows a centrifugal force CF2 acting on a line SGL having a gradient larger than that of the line of intersection RIS. Referring to FIGS. 1, 3A, and 3B, a relation between the taper angle and the centrifugal force will be described.

As described above, the centrifugal force CF1 is exerted on the line of intersection RIS on the tapered inner wall 240 by the curving of the flow line when the nozzle 200 moves leftward. The scalar of the centrifugal force CF1 shown in FIG. 3A is the same as the scalar of the centrifugal force CF2 shown in FIG. 3B. The centrifugal force CF1 is orthogonal to the line of intersection RIS. The centrifugal force CF2 is orthogonal to the line SGL.

FIG. 3A shows a horizontal component HF1 of the centrifugal force CF1 and a vertical component VF1 of the centrifugal force CF1. The horizontal component HF1 is exerted in a direction opposite to the movement direction (the left side) of the nozzle 200. Thus, the horizontal component HF1 acts as a drag against the leftward movement of the nozzle 200.

FIG. 3B shows a horizontal component HF2 of the centrifugal force CF2 and a vertical component VF2 of the centrifugal force CF2. The horizontal component HF2 is larger than the horizontal component HF1. This means that the drag of the movement direction of the nozzle 200 decreases when the taper angle β is a large value. According to the inventors, when the taper angle β is set so that the inequality described in the first embodiment holds, the servo-valve 100 can have a response performance higher than that of the known servo-valve. For example, the taper angle β may be set to 900 or more.

Third Embodiment

The taper angle of the nozzle may be determined based on the pair of inflow ports formed in the receiver. In a third embodiment, a method of determining the taper angle based on the pair of inflow ports formed in the receiver will be described.

Figure 4:
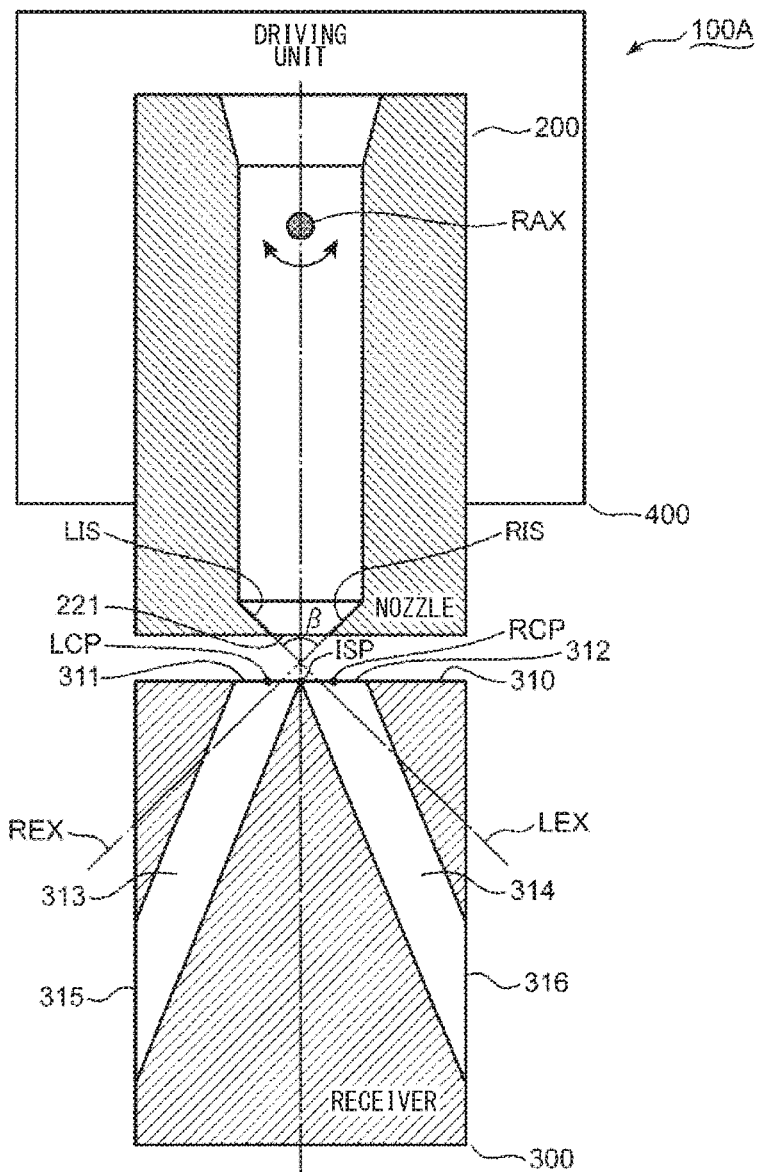
FIG. 4 is a conceptual diagram showing a servo-valve of a third embodiment.

FIG. 4 is a conceptual diagram of a servo-valve 100A of the third embodiment. Referring to FIG. 4, the servo-valve 100A will be described. The explanation of the first embodiment is incorporated in the description of the elements denoted by the same reference numerals as those of the first embodiment. In the embodiment, terms like "upward," "downward," "leftward," "rightward," "clockwise," "counterclockwise," "vertical," and "horizontal" indicating directions are used merely for the purpose of making the explanation unambiguous. The principle of the embodiments is not by any means limited by these terms denoting the directions.

Like the first embodiment, the servo-valve 100A includes the nozzle 200 and the receiver 300. The explanation in the first embodiment is incorporated in the description of these elements.

The servo-valve 100A further includes a driving unit 400. The driving unit 400 oscillates the nozzle 200 about the rotation axis RAX. The driving unit 400 may be a general torque motor which gives a rotational force to the nozzle 200 by using an electromagnetic force or other driving devices. The principle of the embodiment is not limited to a specific device used as the driving unit 400.

The nozzle 200 shown in FIG. 4 is positioned at the neutral position. FIG. 4 shows a point ISP of intersection between the upper surface 310 of the receiver 300 and the center line of the nozzle 200 at the neutral position. The point ISP of intersection is positioned on the line passing through the center point LCP of the left inflow port 311 and the center point RCP of the right inflow port 312.

When the nozzle 200 is oscillated clockwise from the neutral position by the driving unit 400, the discharge port 221 moves leftward. All this while, the point ISP of intersection moves along the line passing through the center point LCP of the left inflow port 311 and the center point RCP of the right inflow port 312 and approaches the center point LCP of the left inflow port 311. As a result, the hydraulic fluid mainly flows into the left inflow port 311. As described in the second embodiment, the horizontal component of the centrifugal force of the hydraulic fluid acting on the line of intersection RIS becomes larger than the horizontal component of the centrifugal force of the hydraulic fluid acting on the line of intersection LIS while the hydraulic fluid mainly flows into the left inflow port 311.

When the nozzle 200 is oscillated counterclockwise from the neutral position by the driving unit 400, the discharge port 221 moves rightward. All this while, the point ISP of intersection moves along the line passing through the center point LCP of the left inflow port 311 and the center point RCP of the right inflow port 312 and approaches the center point RCP of the right inflow port 312. As a result, the hydraulic fluid mainly flows into the right inflow port 312. As described in the second embodiment, the horizontal component of the centrifugal force of the hydraulic fluid acting on the line of intersection LIS becomes larger than the horizontal component of the centrifugal force of the hydraulic fluid acting on the line of intersection RIS while the hydraulic fluid mainly flows into the right inflow port 312. In the embodiment, the flow force is exemplified by the horizontal component of the centrifugal force of the hydraulic fluid.

FIG. 4 shows extended lines LEX and REX which extend from the lower ends of the lines of intersection LIS and RIS toward the receiver 300. The taper angle β may be determined so that the extended line LEX extends inside the right inflow port 312 and the extended line REX extends inside the left inflow port 311. Since the taper angle β becomes larger than the taper angle of the known nozzle, the horizontal components acting on the lines of intersection LIS and RIS become smaller than those of the known nozzle.

Fourth Embodiment

In the above-described embodiments, the form of the tapered pipe portion is a truncated cone with a straight generation line. Alternatively, the form of the tapered pipe portion may be spherical or ellipsoidal. In this case, the tapered inner wall draws an outline curved on a virtual plane enclosing the center of the left inflow port, the center of the right inflow port, and the center of the discharge port. The design principle described in the third embodiment can be also applied to a nozzle including a tapered inner wall drawing an outline curved on a virtual plane. In a fourth embodiment, an illustrative servo-valve including a nozzle with a tapered inner wall drawing an outline curved on a virtual plane will be described.

Figure 5:
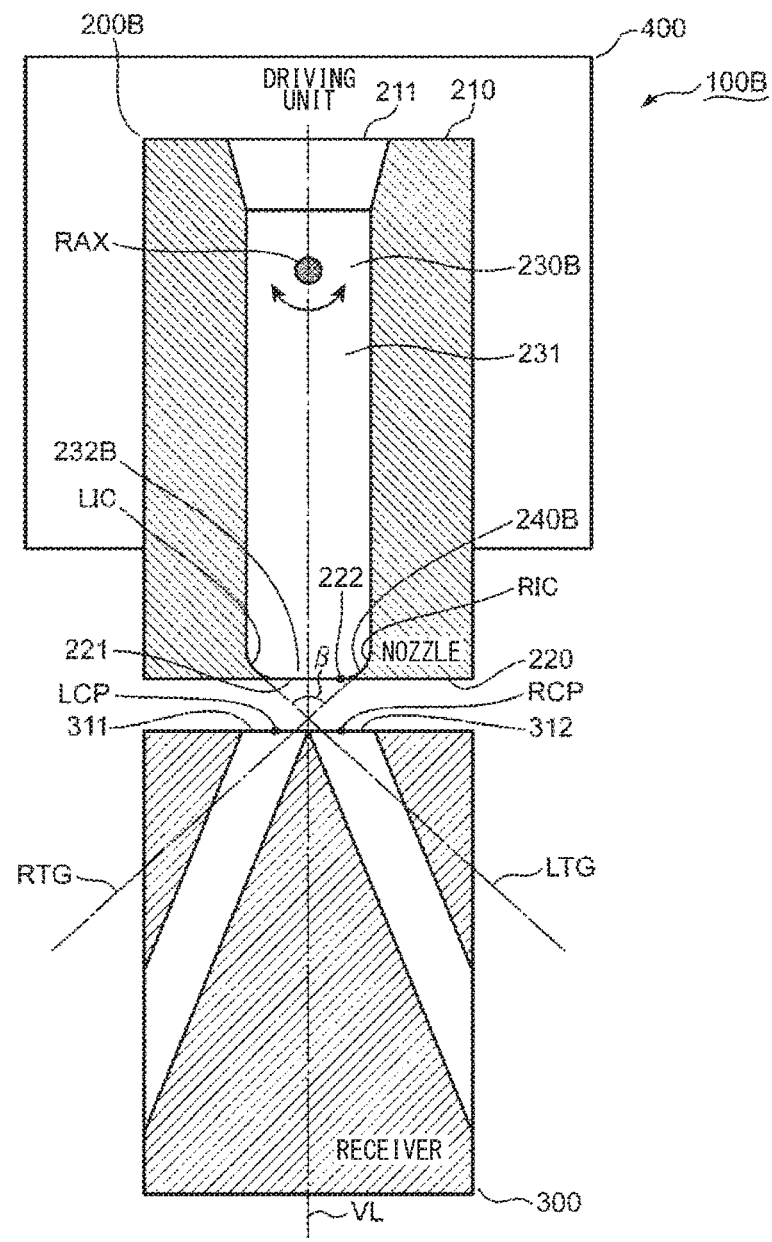
FIG. 5 is a conceptual diagram showing a servo-valve of a fourth embodiment.

FIG. 5 is a conceptual diagram showing a servo-valve 100B of the fourth embodiment. Referring to FIG. 5, the servo-valve 100B will be described. The explanation of the third embodiment is incorporated in the description of the elements denoted by the same reference numerals as those of the third embodiment. In the embodiment, terms like "upward," "downward," "leftward," "rightward," "clockwise," "counterclockwise," "vertical," and "horizontal" indicating directions are used merely for the purpose of making the explanation unambiguous. The principle of the embodiments is not by any means limited by these terms denoting the directions.

Like the third embodiment, the servo-valve 100B includes the receiver 300 and the driving unit 400. The explanation of the third embodiment is incorporated in the description of these elements.

The servo-valve 100B further includes a nozzle 200B. Like the third embodiment, the nozzle 200B includes the upper surface 210 and the lower surface 220. The explanation of the third embodiment is incorporated in the description of these elements.

A nozzle flow path 230B is formed inside the nozzle 200B. The nozzle flow path 230B extends downward from the inflow port 211 formed in the upper surface 210 and is coupled to the discharge port 221 formed in the lower surface 220. Like the third embodiment, the nozzle flow path 230B includes the straight run of pipe 231. The explanation of the third embodiment is incorporated in the description of the straight run of pipe 231.

The nozzle flow path 230B further includes a tapered pipe portion 232B. The tapered pipe portion 232B extends downward from the straight run of pipe 231 and is opened at the discharge port 221. The tapered pipe portion 232B has a semi-elliptical spherical form which grows narrower toward the discharge port 221. The discharge pressure of the hydraulic fluid can be increased by the tapered pipe portion 232B. The high-pressure hydraulic fluid is discharged from the discharge port 221. When the nozzle 200B is positioned at the neutral position, the hydraulic fluid discharge direction from the discharge port 221 substantially matches the vertical line VL. When the nozzle 200B is oscillated clockwise, the hydraulic fluid is discharged toward lower left from the discharge port 221. When the nozzle 200B is oscillated counterclockwise, the hydraulic fluid is discharged toward lower right from the discharge port 221.

The nozzle 200B includes a tapered inner wall 240B which forms the outline of the tapered pipe portion 232B. The discharge edge 222 is positioned at a boundary between the tapered inner wall 240B and the lower surface 220.

FIG. 5 shows the center point LCP of the left inflow port 311 and the center point RCP of the right inflow port 312. A relative positional relation between the nozzle 200B and the receiver 300 is set so that the vertical line VL and the center points LCP and RCP are positioned on the common virtual plane. FIG. 5 conceptually shows the cross-sections of the nozzle 200B and the receiver 300 on the common virtual plane.

FIG. 5 shows two lines of intersection LIC and RIC which are formed by the virtual plane and the tapered inner wall 240B. The line of intersection LIC is formed at the left side of the vertical line VL. The line of intersection RIC is formed at the right side of the vertical line VL. Two lines of intersection LIC and RIC are curves which have a point-symmetrical relation with respect to the vertical line VL. In the embodiment, the first line of intersection is exemplified by one of the lines of intersection LIC and RIC. The second line of intersection is exemplified by the other of the lines of intersection LIC and RIC.

FIG. 5 shows tangential lines LTG and RTG for the lines of intersection LIC and RIC. The tangential line LTG contacts the line of intersection LIC at the midpoint between the upper end of the line of intersection LIC (that is, the end positioned at the boundary between the tapered pipe portion 232 and the straight run of pipe 231) and the discharge edge 222 corresponding to the lower end of the line of intersection LIC. The tangential line RTG contacts the line of intersection RIC at the midpoint between the upper end of the line of intersection RIC (that is, the end positioned at the boundary between the tapered pipe portion 232 and the straight run of pipe 231) and the discharge edge 222 corresponding to the lower end of the line of intersection RIC. The taper angle β may be defined as the angle of intersection of the tangential lines LTG and RTG.

When the nozzle 200B is positioned at the neutral position, the taper angle β may be determined so that the tangential line LTG extends inside the right inflow port 312 and the tangential line RTG extends inside the left inflow port 311. Since the taper angle β becomes larger than the taper angle of the known nozzle, a horizontal component exerted on the lines of intersection LIC and RIC becomes smaller than that of the known nozzle.

Fifth Embodiment

In the above-described embodiments, the tapered pipe portion is formed at the lower end of the nozzle. However, the tapered pipe portion may be formed at other positions. In a fifth embodiment, an illustrative servo-valve including a nozzle provided with a straight run of pipe below a tapered pipe portion will be described.

Figure 6:
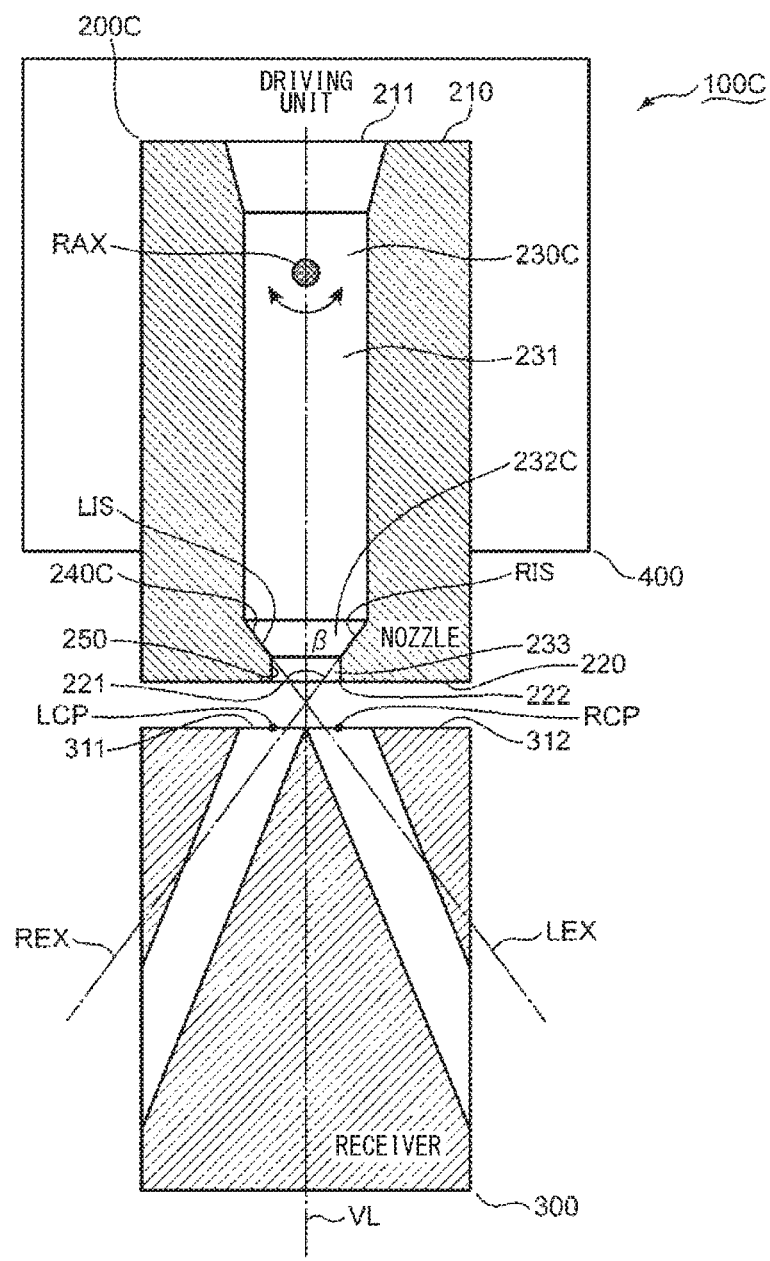
FIG. 6 is a conceptual diagram showing a servo-valve of a fifth embodiment.

FIG. 6 is a conceptual diagram showing a servo-valve 100C of the fifth embodiment. Referring to FIG. 6, the servo-valve 100C will be described. The explanation of the above-described embodiments is incorporated in the description of the elements denoted by the same reference numerals as those of the above-described embodiments. In the embodiment, terms like "upward," "downward," "leftward," "rightward," "clockwise," "counterclockwise," "vertical," and "horizontal" indicating directions are used merely for the purpose of making the explanation unambiguous. The principle of the embodiments is not by any means limited by these terms denoting the directions.

Like the fourth embodiment, the servo-valve 100C includes the receiver 300 and the driving unit 400. The explanation of the fourth embodiment is incorporated in the description of these elements.

The servo-valve 100C further includes a nozzle 200C. Like the fourth embodiment, the nozzle 200C includes the upper surface 210 and the lower surface 220. The explanation of the fourth embodiment is incorporated in the description of these elements.

A nozzle flow path 230C is formed inside the nozzle 200C. The nozzle flow path 230C extends downward from the inflow port 211 formed in the upper surface 210 and is coupled to the discharge port 221 formed in the lower surface 220. Like the fourth embodiment, the nozzle flow path 230C includes the straight run of pipe 231. The explanation of the fourth embodiment is incorporated in the description of the straight run of pipe 231.

The nozzle flow path 230C further includes a tapered pipe portion 232C and a lower pipe portion 233. The tapered pipe portion 232C becomes narrower downward from the straight run of pipe 231 and is coupled to the lower pipe portion 233. The lower pipe portion 233 extends downward from the tapered pipe portion 232C and is opened at the discharge port 221. Differently from the tapered pipe portion 232C, the lower pipe portion 233 is a straight pipe. The discharge pressure of the hydraulic fluid can be increased by the tapered pipe portion 232C. Subsequently, the hydraulic fluid is slightly straightened by the lower pipe portion 233 and is discharged from the discharge port 221. When the nozzle 200C is positioned at the neutral position, the hydraulic fluid discharge direction from the discharge port 221 substantially matches the vertical line VL. When the nozzle 200C is oscillated clockwise, the hydraulic fluid is discharged toward lower left from the discharge port 221. When the nozzle 200C is oscillated counterclockwise, the hydraulic fluid is discharged toward lower right from the discharge port 221.

The nozzle 200C includes a tapered inner wall 240C and a lower pipe wall 250. The tapered inner wall 240C forms the outline of the tapered pipe portion 232C. The lower pipe wall 250 extends downward from the tapered inner wall 240C and is terminated at the discharge edge 222. The lower pipe wall 250 forms the outline of the lower pipe portion 233.

FIG. 6 shows the center point LCP of the left inflow port 311 and the center point RCP of the right inflow port 312. A relative positional relation between the nozzle 200C and the receiver 300 is set so that the vertical line VL and the center points LCP and RCP are positioned on the common virtual plane.

FIG. 6 conceptual shows the cross-sections of the nozzle 200C and the receiver 300 on the common virtual plane.

FIG. 6 shows two lines of intersection LIS and RIS which are formed by the virtual plane and the tapered inner wall 240C. The line of intersection LIS is formed at the left side of the vertical line VL. The line of intersection RIS is formed at the right side of the vertical line VL. Two lines of intersection LIS and RIS are curves which have a point-symmetrical relation with respect to the vertical line VL.

FIG. 4 shows the extended lines LEX and REX which extend from the lower ends of the lines of intersection LIS and RIS toward the receiver 300. The taper angle β may be determined so that the extended line LEX extends inside the right inflow port 312 and the extended line REX extends inside the left inflow port 311. Since the taper angle β becomes larger than the taper angle of the known nozzle, a horizontal component exerted on the lines of intersection LIS and RIS becomes smaller than that of the known nozzle.

A force in a direction opposite to the movement direction of the nozzle 200C acts on the lower pipe wall 250. Thus, the axial dimension of the lower pipe portion 233 is determined so that a force in a direction opposite to the movement direction of the nozzle 200C does not excessively increase. The axial dimension of the lower pipe portion 233 may be smaller than that of the tapered pipe portion 232C.

Sixth Embodiment

In the design principle of the above-described embodiments, there is a case in which an excessively large resistance is exerted on the hydraulic fluid around the discharge port. In a sixth embodiment, an illustrative servo-valve including a nozzle with a pipe structure reducing a resistance around a discharge port will be described.

Figure 7:
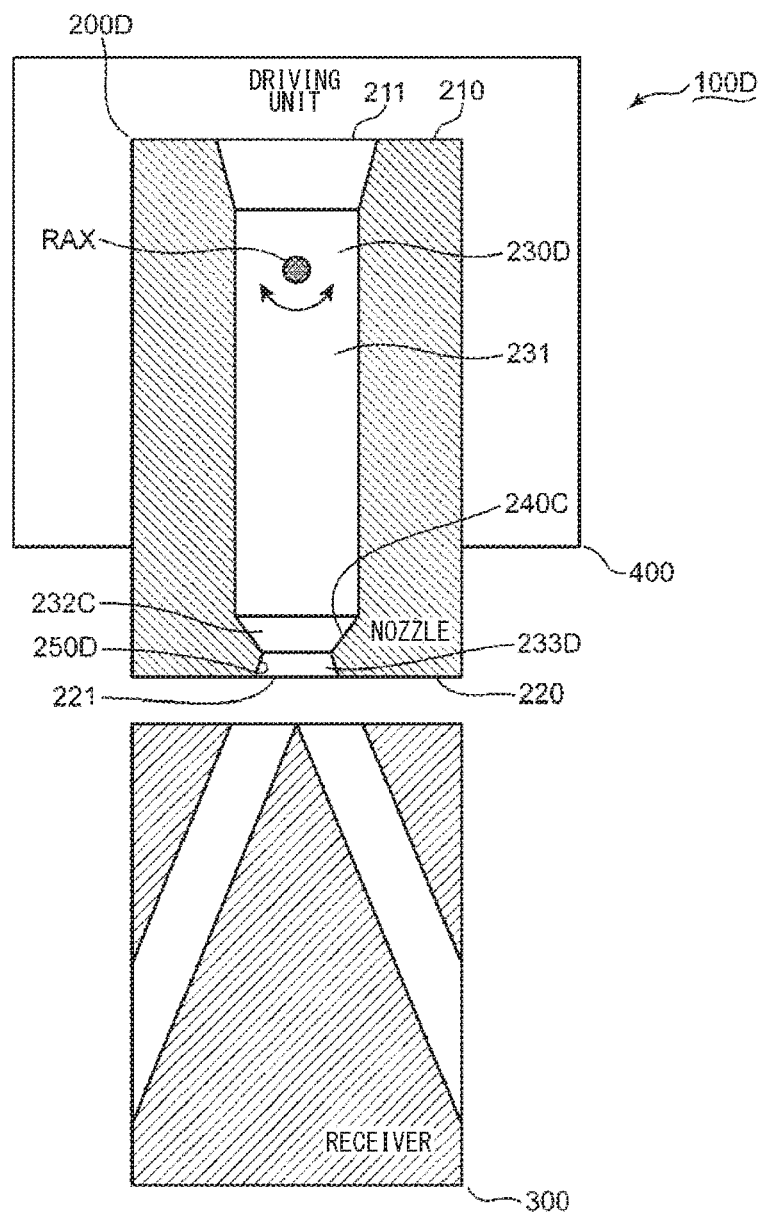
FIG. 7 is a conceptual diagram showing a servo-valve of a sixth embodiment.

FIG. 7 is a conceptual diagram showing a servo-valve 100D of the sixth embodiment. Referring to FIG. 7, the servo-valve 100D will be described. The explanation of the above-described embodiments is incorporated in the description of the elements denoted by the same reference numerals as those of the above-described embodiments. In the embodiment, terms like "upward," "downward," "leftward," "rightward," "clockwise," "counterclockwise," "vertical," and "horizontal" indicating directions are used merely for the purpose of making the explanation unambiguous. The principle of the embodiments is not by any means limited by these terms denoting the directions.

Like the fifth embodiment, the servo-valve 100D includes the receiver 300 and the driving unit 400. The explanation of the fifth embodiment is incorporated in the description of these elements.

The servo-valve 100D further includes a nozzle 200D. Like the fifth embodiment, the nozzle 200D includes the upper surface 210 and the lower surface 220. The explanation of the fifth embodiment is incorporated in the description of these elements.

A nozzle flow path 230D is formed inside the nozzle 200D. The nozzle flow path 230D extends downward from the inflow port 211 formed in the upper surface 210 and is coupled to the discharge port 221 formed in the lower surface 220. Like the fifth embodiment, the nozzle flow path 230D includes the straight run of pipe 231 and the tapered pipe portion 232C. The explanation of the fifth embodiment is incorporated in the description of these elements.

The nozzle flow path 230D further includes a lower pipe portion 233D. The lower pipe portion 233D becomes narrower upward from the discharge port 221 and is coupled to the lower end of the tapered pipe portion 232C. Differently from the fifth embodiment, the cross-section of the lower pipe portion 233D increases downward. Thus, a resistance acting on the hydraulic fluid does not excessively increases around the discharge port 221.

The nozzle 200D includes a lower pipe wall 250D. The tapered inner wall 240C forms the outline of the tapered pipe portion 232C. The lower pipe wall 250D extends downward from the tapered inner wall 240C and is terminated at the discharge edge 222. The lower pipe wall 250D forms the outline of the lower pipe portion 233D.

A force in a direction opposite to the movement direction of the nozzle 200D acts on the lower pipe wall 250D. Thus, the axial dimension of the lower pipe portion 233D is set so that a force in a direction opposite to the movement direction of the nozzle 200D does not excessively increase. The axial dimension of the lower pipe portion 233D may be smaller than that of the tapered pipe portion 232C.

Seventh Embodiment

The servo-valve according to the above-described embodiment can be assembled to various fluidic devices driven by the hydraulic fluid. In a seventh embodiment, an illustrative fluidic device will be described.

Figure 8:
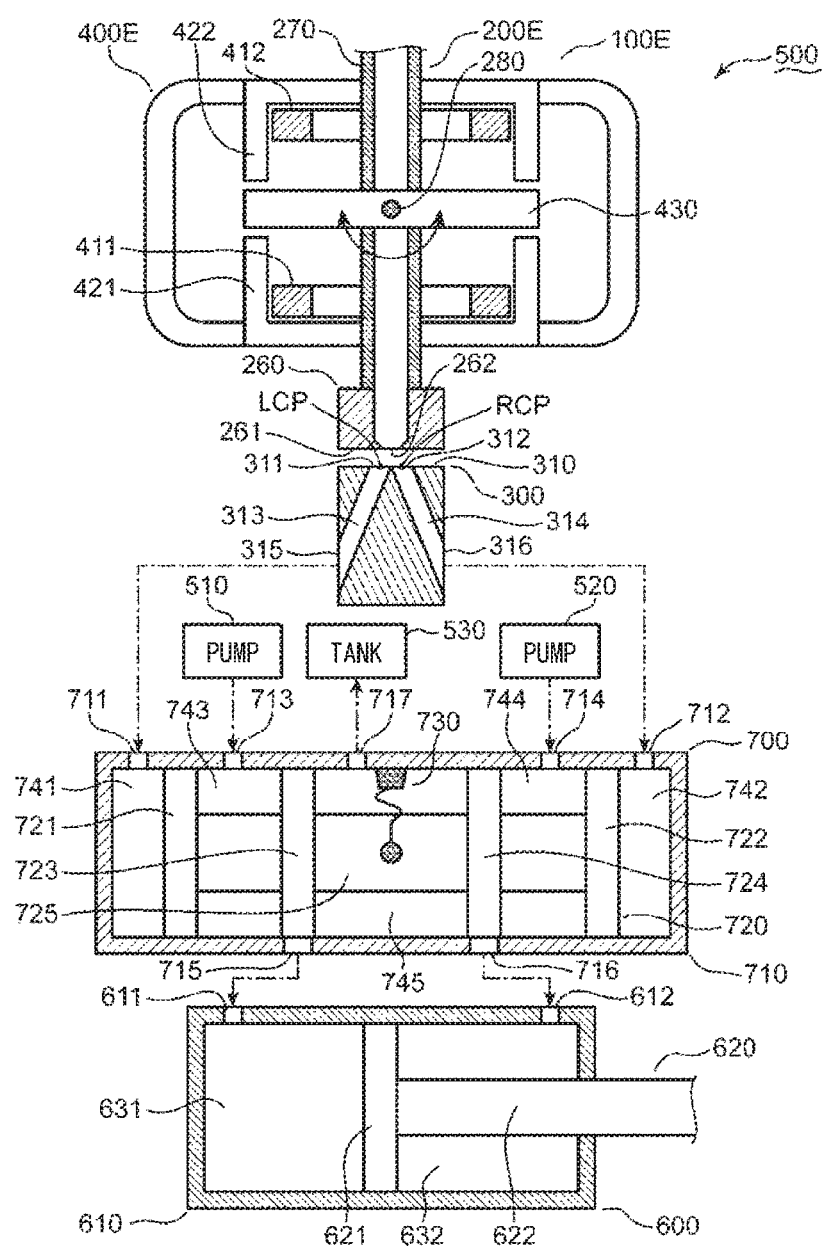
FIG. 8 is a schematic diagram showing a fluidic device of a seventh embodiment.

FIG. 8 is a schematic diagram showing a fluidic device 500 of the seventh embodiment. Referring to FIGS. 4 and 8, the fluidic device 500 will be described. The explanation of the third embodiment is incorporated in the description of the elements indicated by the same reference numerals as in the third embodiment.

The fluidic device 500 includes a servo-valve 100E, an actuator 600, two pumps 510 and 520, and a tank 530. Like the third embodiment, the servo-valve 100E includes a receiver 300. The explanation of the third embodiment is incorporated in the description of the receiver 300. The inclination angles of the left flow path 313 and the right flow path 314 formed in the receiver 300 are determined based on the design principle described in the above-described embodiments.

The servo-valve 100E includes a torque motor 400E. The torque motor 400E corresponds to the driving unit 400 described with reference to FIG. 4. The explanation of the driving unit 400 is incorporated in the description of the torque motor 400E.

The torque motor 400E includes a lower coil 411, an upper coil 412, a lower magnetic piece 421, an upper magnetic piece 422, and a magnetic rod 430. The upper coil 412 is disposed above the lower coil 411. The lower magnetic piece 421 may be formed in a substantially cylindrical form. The lower coil 411 is accommodated inside the lower magnetic piece 421. Like the lower magnetic piece 421, the upper magnetic piece 422 may be formed in a substantially cylindrical form. The upper coil 412 is disposed inside the upper magnetic piece 422. The lower edge of the upper magnetic piece 422 faces the upper edge of the lower magnetic piece 421. The magnetic rod 430 extends substantially horizontally. The left and right ends of the magnetic rod 430 are located in a gap between the upper edge of the lower magnetic piece 421 and the lower edge of the upper magnetic piece 422.

A current is supplied to the lower coil 411 and the upper coil 412. As a result, the lower magnetic piece 421 and the upper magnetic piece 422 serve as magnets. When a current is supplied to the lower coil 411 and the upper coil 412 so that the right end of the magnetic rod 430 is pulled to the lower magnetic piece 421 and the left end of the magnetic rod 430 is pulled to the upper magnetic piece 422, the magnetic rod 430 rotates clockwise. When a current is supplied to the lower coil 411 and the upper coil 412 so that the left end of the magnetic rod 430 is pulled to the lower magnetic piece 421 and the right end of the magnetic rod 430 is pulled to the upper magnetic piece 422, the magnetic rod 430 rotates counterclockwise.

The servo-valve 100E includes a nozzle portion 200E. The nozzle portion 200E corresponds to the nozzle 200 described with reference to FIG. 4. The explanation of the nozzle 200 may be incorporated in the description of the nozzle portion 200E.

The nozzle portion 200E includes a nozzle piece 260, a flexible tube 270, and a coupling shaft 280. The flexible tube 270 extends vertically to penetrate the torque motor 400E. The nozzle piece 260 is attached to the lower end of the flexible tube 270. The high-pressure hydraulic fluid is supplied to the flexible tube 270. The hydraulic fluid is guided by the flexible tube 270 to reach the nozzle piece 260.

The nozzle piece 260 includes a lower surface 261 which faces the upper surface 310 of the receiver 300. The lower surface 261 is provided with a discharge port 262. The taper angle of the tapered pipe portion extended toward the discharge port 262 is determined based on the design principle described in the third embodiment. The high-pressure hydraulic fluid which is supplied to the nozzle piece 260 is discharged from the discharge port 262. Subsequently, the hydraulic fluid flows into the receiver 300.

The coupling shaft 280 is used so that the flexible tube 270 is coupled to an intermediate portion of the magnetic rod 430. The flexible tube 270 and the nozzle piece 260 move left and right in a reciprocating manner in response to the clockwise and counterclockwise rotations of the magnetic rod 430.

When the magnetic rod 430 rotates about the coupling shaft 280 clockwise, the discharge port 262 of the nozzle piece 260 moves leftward along the line connecting the center point LCP of the left inflow port 311 and the center point RCP of the right inflow port 312. Since the taper angle of the inner wall portion of the nozzle piece 260 is determined based on the design principle described in the third embodiment, a rightward force exerted from the hydraulic fluid to the inner wall of the nozzle piece 260 is small. Thus, the nozzle piece 260 can quickly move left. When the nozzle piece 260 moves leftward, the area of overlapping between the discharge port 262 and the left inflow port 311 increases and the area of overlapping between the discharge port 262 and the right inflow port 312 decreases. In this case, the amount of the hydraulic fluid flowing into the left flow path 313 formed inside the receiver 300 exceeds the flow rate of the hydraulic fluid flowing into the right flow path 314.

When the magnetic rod 430 rotates about the coupling shaft 280 counterclockwise, the discharge port 262 of the nozzle piece 260 moves rightward along the line connecting the center point LCP of the left inflow port 311 and the center point RCP of the right inflow port 312. Since the taper angle of the inner wall portion of the nozzle piece 260 is determined based on the design principle described in the third embodiment, a leftward force exerted from the hydraulic fluid to the inner wall of the nozzle piece 260 is small. Thus, the nozzle piece 260 can quickly move right. When the nozzle piece 260 moves rightward, the area of overlapping between the discharge port 262 and the right inflow port 312 increases and the area of overlapping between the discharge port 262 and the left inflow port 311 decreases. In this case, the amount of the hydraulic fluid flowing into the right flow path 314 formed inside the receiver 300 exceeds the flow rate of the hydraulic fluid flowing into the left flow path 313.

The servo-valve 100E includes a spool valve 700. The spool valve 700 includes a casing 710, a spool 720, and a cantilever spring 730. The spool 720 is disposed inside the casing 710. As a result, a flow path through which the hydraulic fluid flows is formed inside the casing 710. The cantilever spring 730 is used so that the casing 710 and the spool 720 are coupled to each other. The cantilever spring 730 applies a force of keeping the spool 720 at the closed position to the spool 720. When the spool 720 is located at the closed position, the spool valve 700 interrupts the hydraulic fluid supply path from the pumps 510 and 520 to the actuator 600. When the spool 720 moves leftward or rightward from the closed position, the spool valve 700 opens the hydraulic fluid supply path from the pumps 510 and 520 to the actuator 600.

The casing 710 is provided with seven ports 711 to 717. The port 711 is connected in fluid communication with the left outflow port 315 of the receiver 300. The port 712 is connected in fluid communication with the right outflow port 316 of the receiver 300. The pumps 510 and 520 are respectively attached to the ports 713 and 714. The ports 715 and 716 are connected in fluid communication with the actuator 600. The tank 530 is attached to the port 717.

The spool 720 includes four partition walls 721, 722, 723, and 724 and a coupling shaft 725 used so that the partition walls 721, 722, 723, and 724 are coupled to one another. The coupling shaft 725 extends substantially horizontally. The partition wall 721 is formed at the left end of the coupling shaft 725. The partition wall 722 is formed at the right end of the coupling shaft 725. The partition wall 723 is located between the partition walls 721 and 722. The partition wall 724 is located between the partition walls 722 and 723.

The partition walls 721, 722, 723, and 724 divide the inner space of the casing 710 into five chambers 741, 742, 743, 744, and 745. The chamber 741 moves to the leftmost side. The chamber 742 moves to the rightmost side. The chamber 743 is formed between the partition walls 721 and 723. The chamber 744 is formed between the partition walls 722 and 724. The chamber 745 is formed between the partition walls 723 and 724.

When the nozzle piece 260 moves leftward, the hydraulic fluid mainly flows from the discharge port 262 of the nozzle piece 260 to the left inflow port 311 of the receiver 300. Subsequently, the hydraulic fluid which flows into the left inflow port 311 flows into the chamber 741 through the left flow path 313 of the receiver 300, the left outflow port 315 of the receiver 300, and the port 711 of the spool valve 700. As a result, the inner pressure of the chamber 741 increases and the spool 720 moves rightward from the closed position. All this while, the hydraulic fluid which exists inside the chamber 742 is blown out from the right inflow port 312 through the port 712 of the spool valve 700, the right outflow port 316 of the receiver 300, and the right flow path 314 of the receiver 300. Subsequently, when the nozzle piece 260 returns to the neutral position, the hydraulic fluid ejected from the discharge port 262 of the nozzle piece 260 flows in substantially in the same quantity into the left inflow port 311 and the right inflow port 312 of the receiver 300. All this while, a force exerted on the left side of the spool 720 is larger than a force exerted on the right side of the spool 720 by a magnitude commensurate with the resilience of the cantilever spring 730. Thus, the spool 720 moves leftward and returns to the closed position.

When the nozzle piece 260 moves rightward, the hydraulic fluid mainly flows from the discharge port 262 of the nozzle piece 260 to the right inflow port 312 of the receiver 300. Subsequently, the hydraulic fluid which flows into the right inflow port 312 flows into the chamber 742 through the right flow path 314 of the receiver 300, the right outflow port 316 of the receiver 300, and the port 712 of the spool valve 700. As a result, the inner pressure of the chamber 742 increases and the spool 720 moves leftward from the closed position. All this while, the hydraulic fluid which exists inside the chamber 741 is blown out from the left inflow port 311 through the port 711 of the spool valve 700, the left outflow port 315 of the receiver 300, and the left flow path 313 of the receiver 300. Subsequently, when the nozzle piece 260 returns to the neutral position, the hydraulic fluid which is ejected from the discharge port 262 of the nozzle piece 260 flows in substantially in the same quantity into the left inflow port 311 and the right inflow port 312 of the receiver 300. All this while, a force exerted on the right side of the spool 720 is larger than a force exerted on the left side of the spool 720 by a magnitude commensurate with the resilience of the cantilever spring 730. Thus, the spool 720 moves rightward and returns to the closed position.

When the spool 720 is located at the closed position, the partition wall 723 closes the port 715. At this time, the partition wall 724 closes the port 716. The pump 510 supplies the high-pressure hydraulic fluid to the chamber 743 through the port 713. The pump 520 supplies the high-pressure hydraulic fluid to the chamber 744 through the port 714. When the spool 720 moves rightward from the closed position, the hydraulic fluid supply path from the chamber 743 to the actuator 600 and the hydraulic fluid discharge path from the actuator 600 to the chamber 745 are opened. When the spool 720 moves leftward from the closed position, the hydraulic fluid supply path from the chamber 744 to the actuator 600 and the hydraulic fluid discharge path from the actuator 600 to the chamber 745 are opened. Thus, the amount of the hydraulic fluid flowing from the ports 715 and 716 to the actuator 600 is adjusted by the left and right movement of the nozzle piece 260. In the embodiment, the first outflow port is exemplified by one of the ports 715 and 716. The second outflow port is exemplified by the other of the ports 715 and 716.

The actuator 600 includes a casing 610 and a movable piece 620. The casing 610 is provided with two ports 611 and 612. The port 611 of the actuator 600 is connected in fluid communication with to the port 715 of the spool valve 700. The port 612 of the actuator 600 is connected in fluid communication with to the port 716 of the spool valve 700.

The movable piece 620 includes a partition wall 621 and a rod 622. The partition wall 621 divides the inner space of the casing 610 into a left chamber 631 and a right chamber 632. The port 611 is coupled to the left chamber 631. The port 612 is coupled to the right chamber 632. The rod 622 extends right from the partition wall 621 and protrudes to the outside of the casing 610. The rod 622 is connected to other external devices (not show) disposed outside the casing 610. In the embodiment, the hollow portion is exemplified by the inner space of the casing 610.

When the spool 720 moves rightward from the closed position, the hydraulic fluid which is supplied from the pump 510 to the chamber 743 through the port 713 flows into the left chamber 631 through the ports 715 and 611. Since the inner pressure of the left chamber 631 increases, the movable piece 620 moves rightward. All this while, the right chamber 632 communicates with the chamber 745 through the ports 612 and 716. The hydraulic fluid which exists inside the right chamber 632 is extruded from the right chamber 632 by the movable piece 620 moving right so that the hydraulic fluid flows to the chamber 745. Subsequently, the hydraulic fluid which flows into the chamber 745 is stored in the tank 530.

When the spool 720 moves leftward from the closed position, the hydraulic fluid which is supplied from the pump 520 to the chamber 744 through the port 714 flows into the right chamber 632 through the ports 716 and 612. Since the inner pressure of the right chamber 632 increases, the movable piece 620 moves leftward. All this while, the left chamber 631 communicates with the chamber 745 through the ports 611 and 715. The hydraulic fluid which exists inside the left chamber 631 is extruded from the left chamber 631 by the movable piece 620 moving left so that the hydraulic fluid flows into the chamber 745. Subsequently, the hydraulic fluid which flows into the chamber 745 is stored in the tank 530.

In FIG. 8, the receiver 300 is drawn separately from the casing 710 of the spool valve 700. However, the receiver 300 may be integrated with the casing 710 of the spool valve 700.

In the embodiment, the cantilever spring 730 is coupled to the spool 720 and the casing 710. Instead of the cantilever spring 730, an elastic member coupling the spool 720 and the nozzle portion 200E to each other may be used.

In the embodiment, the actuator 600 is coupled to the spool valve 700. However, the actuator 600 may be directly coupled to the receiver 300.

Eighth Embodiment

The inventors analyzed a relation between the taper angle and the pressure distribution inside the nozzle by using a plurality of different models of the taper angle. In an eighth embodiment, an analysis result will be described.

Figure 9A:
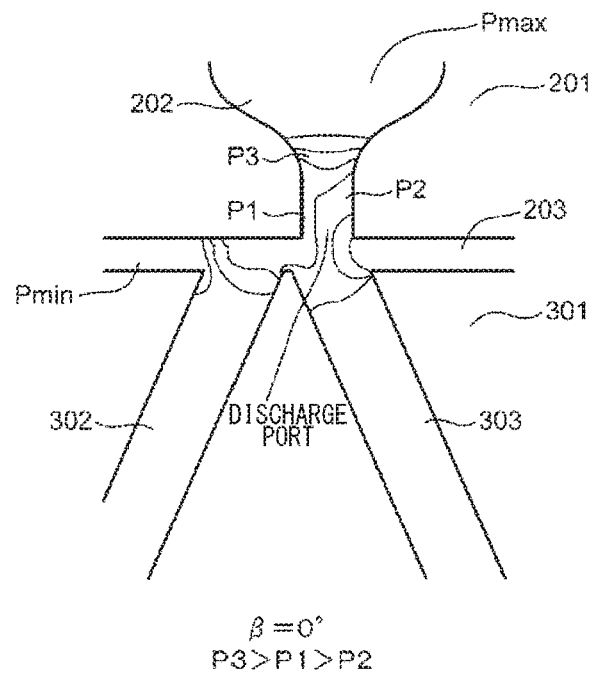
FIG. 9A is an outline map showing a pressure distribution of a hydraulic fluid around a discharge port (eighth embodiment).
Figure 9B:
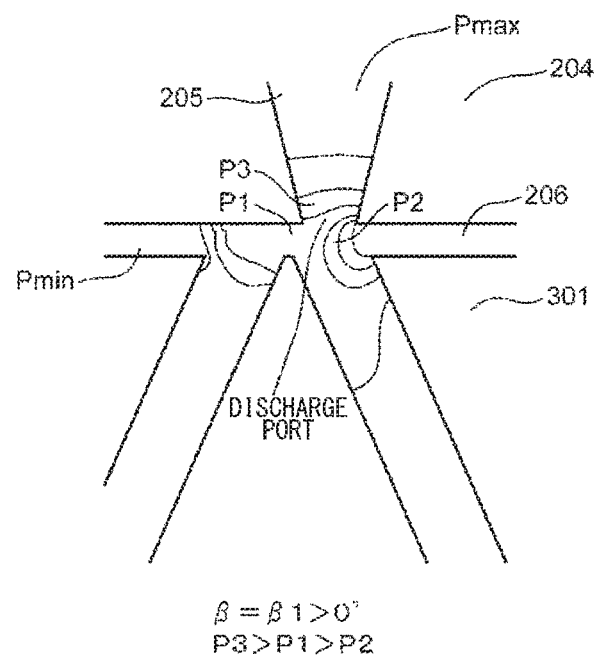
FIG. 9B is an outline map showing a pressure distribution of a hydraulic fluid around a discharge port (eighth embodiment).
Figure 9C:
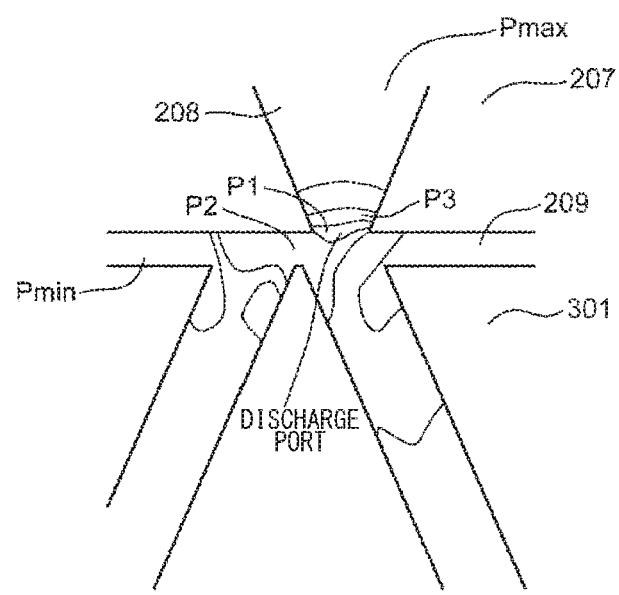
FIG. 9C is an outline map showing a pressure distribution of a hydraulic fluid around a discharge port (eighth embodiment).

FIGS. 9A to 9C are outline maps showing the pressure distribution of the hydraulic fluid around the discharge port. Referring to FIGS. 9A to 9C, a relation between the taper angle and the pressure distribution inside the nozzle will be described.

FIG. 9A shows a nozzle 201 and a receiver 301. The nozzle 201 is provided with a nozzle flow path 202. The receiver 301 is provided with a left flow path 302 and a right flow path 303. A gap 203 is formed between the lower surface of the nozzle 201 and the upper surface of the receiver 301. The taper angle β of the nozzle 201 is "0°." The nozzle 201 moves rightward from the neutral position.

FIG. 9A shows a plurality of outlines showing the pressure distributions inside the nozzle flow path 202, the gap 203, the left flow path 302, and the right flow path 303. As shown in FIG. 9A, an area representing a highest pressure Pmax in the pressure distribution is shown above the nozzle flow path 202. An area representing a lowest pressure Pmin in the pressure distribution is shown at the left portion of the gap 203.

One outline extends in the area of the nozzle flow path 202 in the vicinity of the discharge port in the vertical direction. The left area of the outline is an area of the pressure P1. The right area of the outline is an area of the pressure P2 smaller than the pressure P1. An area above the area of the pressure P1 is an area of the pressure P3 larger than the pressure P1. The area of the pressure P3 is divided from the area of the pressure P1 by the horizontally extended outline. As shown in FIG. 9A, a left portion of the inner wall forming the nozzle flow path 202 is exposed to the high pressure P1 and a right portion of the inner wall forming the nozzle flow path 202 is exposed to the low pressure P2. Thus, a force exerted on the left side of the nozzle 201 is transmitted from the hydraulic fluid. Since a force exerted from the hydraulic fluid to the nozzle 201 is exerted in a direction opposite to the movement direction (that is, the right direction) of the nozzle 201, the response of the nozzle 201 is poor.

Like FIG. 9A, FIG. 9B shows the receiver 301. Further, FIG. 9B shows a nozzle 204. The nozzle 204 is provided with a nozzle flow path 205. A gap 206 is formed between the lower surface of the nozzle 204 and the upper surface of the receiver 301. The taper angle β of the nozzle 204 is "β1(>0°)." A relative position of the nozzle 204 with respect to the receiver 301 is the same as that of the nozzle 201.

The pressures Pmax and Pmin are shown at the substantially same position as that of FIG. 9A. A substantially horizontal outline representing the boundary between the pressures P1 and P3 approaches the discharge port. This means that a difference between the pressure of the left portion of the nozzle flow path 205 and the pressure of the right portion of the nozzle flow path 205 is smaller than a horizontal balance of the pressure inside the nozzle flow path 202. Thus, the nozzle 204 has a response higher than that of the nozzle 201. However, since the left portion of the inner wall forming the nozzle flow path 205 is exposed to a high pressure compared to the right portion of the inner wall forming the nozzle flow path 205, the right displacement of the nozzle 204 is slightly inhibited by the pressure of the hydraulic fluid.

Like FIG. 9A, FIG. 9C shows the receiver 301. Further, FIG. 9B shows a nozzle 207. The nozzle 207 is provided with a nozzle flow path 208. A gap 209 is formed between the lower surface of the nozzle 207 and the upper surface of the receiver 301. The taper angle β of the nozzle 207 is "β2(>β1)." A relative position of the nozzle 207 with respect to the receiver 301 is the same as that of the nozzle 201.

The pressures Pmax and Pmin are shown at the substantially same position as that of FIG. 9A. The outline showing the boundary between the pressures P1 and P3 becomes horizontal compared to the outline of FIG. 9B. Thus, the nozzle 207 has a response higher than that of the nozzle 204. Since the pressure to which the left portion of the inner wall forming the nozzle flow path 205 is exposed is substantially the same as the pressure to which the right portion of the inner wall forming the nozzle flow path 205 is exposed, the pressure of the hydraulic fluid substantially does not inhibit the right displacement of the nozzle 204.

Figure 10A:
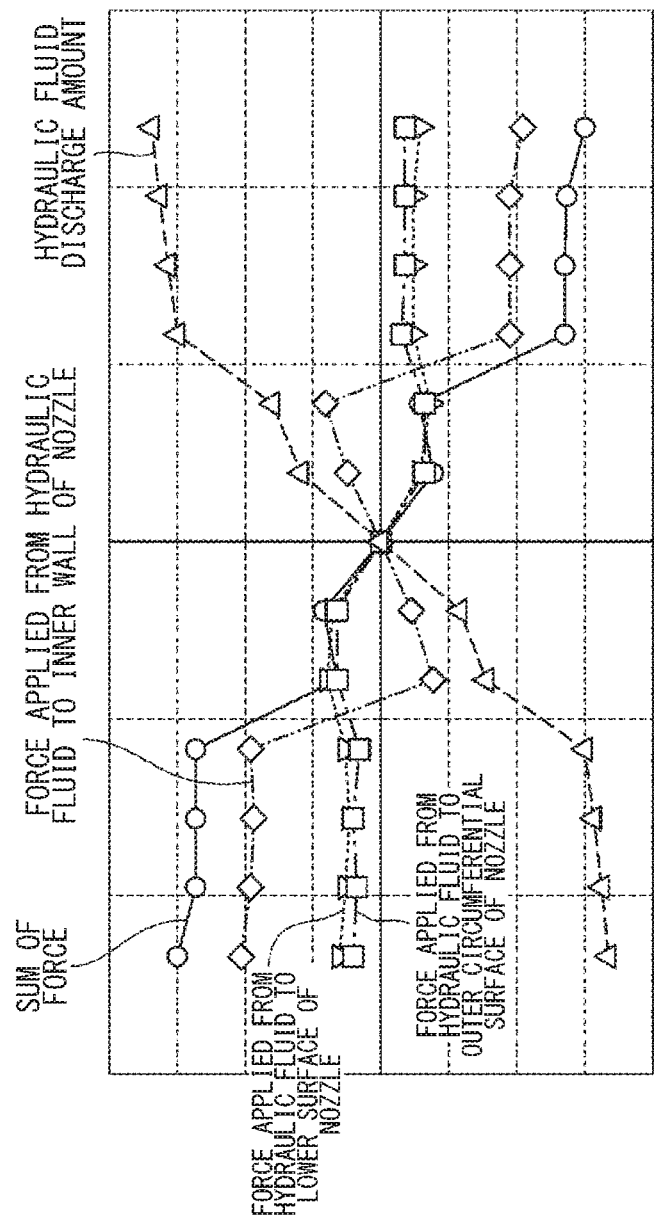
FIG. 10A is a graph showing a relation among a relative position of a nozzle with respect to a receiver, a flow rate of a hydraulic fluid discharged from the nozzle, and a force exerted from the hydraulic fluid to the nozzle (in the case of a taper angle of 0°) (eighth embodiment).
Figure 10B:
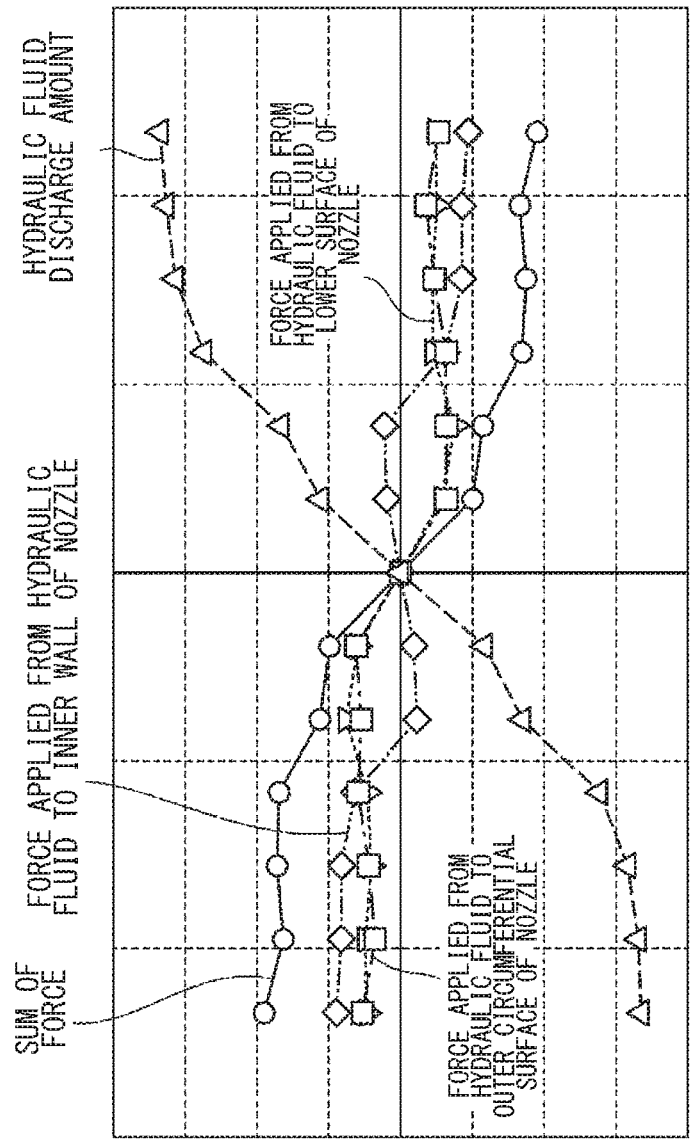
FIG. 10B is a graph showing a relation among a relative position of a nozzle with respect to a receiver, a flow rate of a hydraulic fluid discharged from the nozzle, and a force exerted from the hydraulic fluid to the nozzle (in the case of a small taper angle) (eighth embodiment).
Figure 10C:
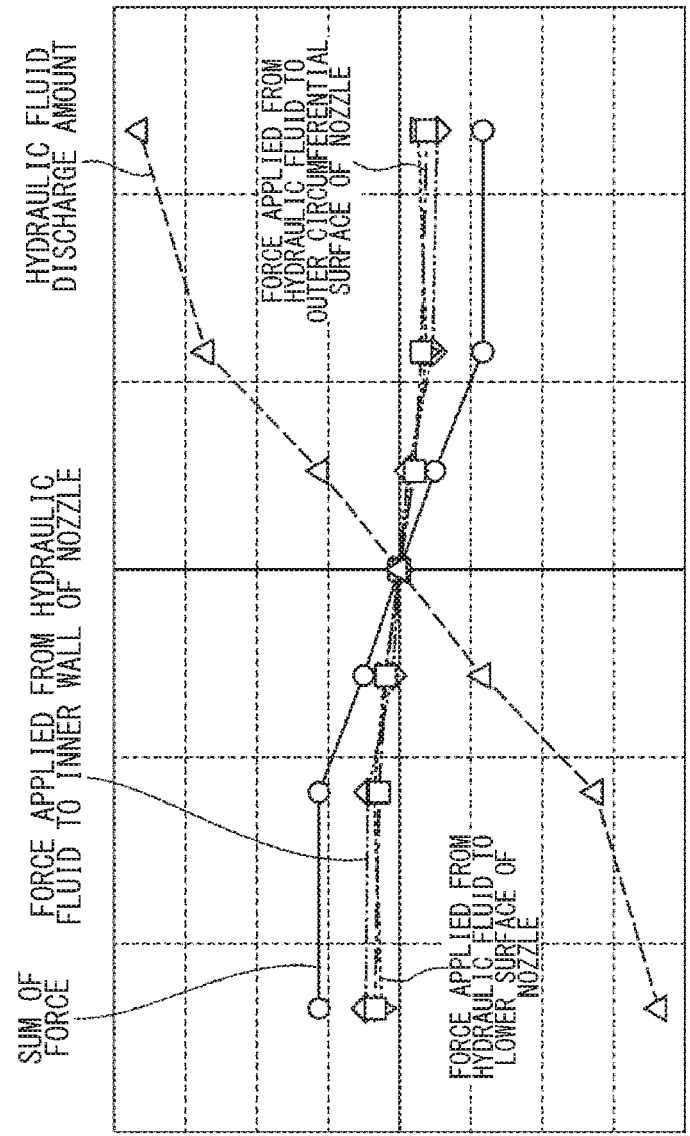
FIG. 10C is a graph showing a relation among a relative position of a nozzle with respect to a receiver, a flow rate of a hydraulic fluid discharged from the nozzle, and a force exerted from the hydraulic fluid to the nozzle (in the case of a large taper angle) (eighth embodiment).

FIG. 10A is a graph showing a relation among the relative position of the nozzle 201 with respect to the receiver 301, the flow rate of the hydraulic fluid discharged from the nozzle 201, and the force exerted from the hydraulic fluid to the nozzle 201. FIG. 10B is a graph showing a relation among the relative position of the nozzle 204 with respect to the receiver 301, the flow rate of the hydraulic fluid discharged from the nozzle 204, and the force exerted from the hydraulic fluid to the nozzle 204. FIG. 10C is a graph showing a relation among the relative position of the nozzle 207 with respect to the receiver 301, the flow rate of the hydraulic fluid discharged from the nozzle 207, and the force exerted from the hydraulic fluid to the nozzle 207. Referring to FIGS. 3A and 3B and FIGS. 9 to 10C, a relation between the taper angle β and the pressure inside the nozzles 201, 204, and 207 will be described.

The horizontal axes of the graphs of FIGS. 10A, 10B, and 10C respectively indicate the relative positions of the nozzles 201, 204, and 207 with respect to the receiver 301. The original points of the graphs of FIGS. 10A, 10B, and 10C indicate the neutral positions. The vertical axes of the graphs of FIGS. 10A, 10B, and 10C indicate the hydraulic fluid discharge amount, the force exerted from the hydraulic fluid to the inner walls of the nozzles 201, 204, and 207, the force exerted from the hydraulic fluid to the lower surfaces of the nozzles 201, 204, and 207 (that is, the surface facing the receiver 301), the force exerted from the hydraulic fluid to the outer circumferential surfaces of the nozzles 201, 204, and 207, and the sum of these forces.

From the graphs of FIGS. 10A, 10B, and 10C, when the taper angle β approaches 0°, it is understood that the force exerted from the hydraulic fluid to the inner wall of the nozzle occupies a large part of the entire force exerted from the hydraulic fluid to the nozzle. As the taper angle β becomes larger than 0°, the influence on the inner wall of the nozzle due to the hydraulic fluid decreases. The analysis result shown in FIGS. 9 to 10C matches the dynamic model (see FIGS. 3A and 3B) described in the second embodiment and verifies the efficiency of the taper angle β with respect to the response performance of the nozzle. The designer who designs the nozzle may determine the taper angle β in consideration of the resistance of the discharge port of the nozzle and the pressure in the horizontal direction exerted from the hydraulic fluid to the inner wall of the nozzle. Thus, the principle of the above-described embodiments is not limited to a specific value of the taper angle β.

The embodiments of the invention have been described above. In the embodiment, the taper angle β determined by the tapered inner wall coupled to the discharge port of the nozzle is larger than twice the angle α formed by the flow path extension direction and a direction orthogonal to the inflow surface. Accordingly, since a component of the flow force exerted from the fluid to the tapered inner wall (a force of inhibiting the displacement of the nozzle) decreases so that the nozzle can be quickly displaced, the response speed of the actuator is improved.

Figure 11:
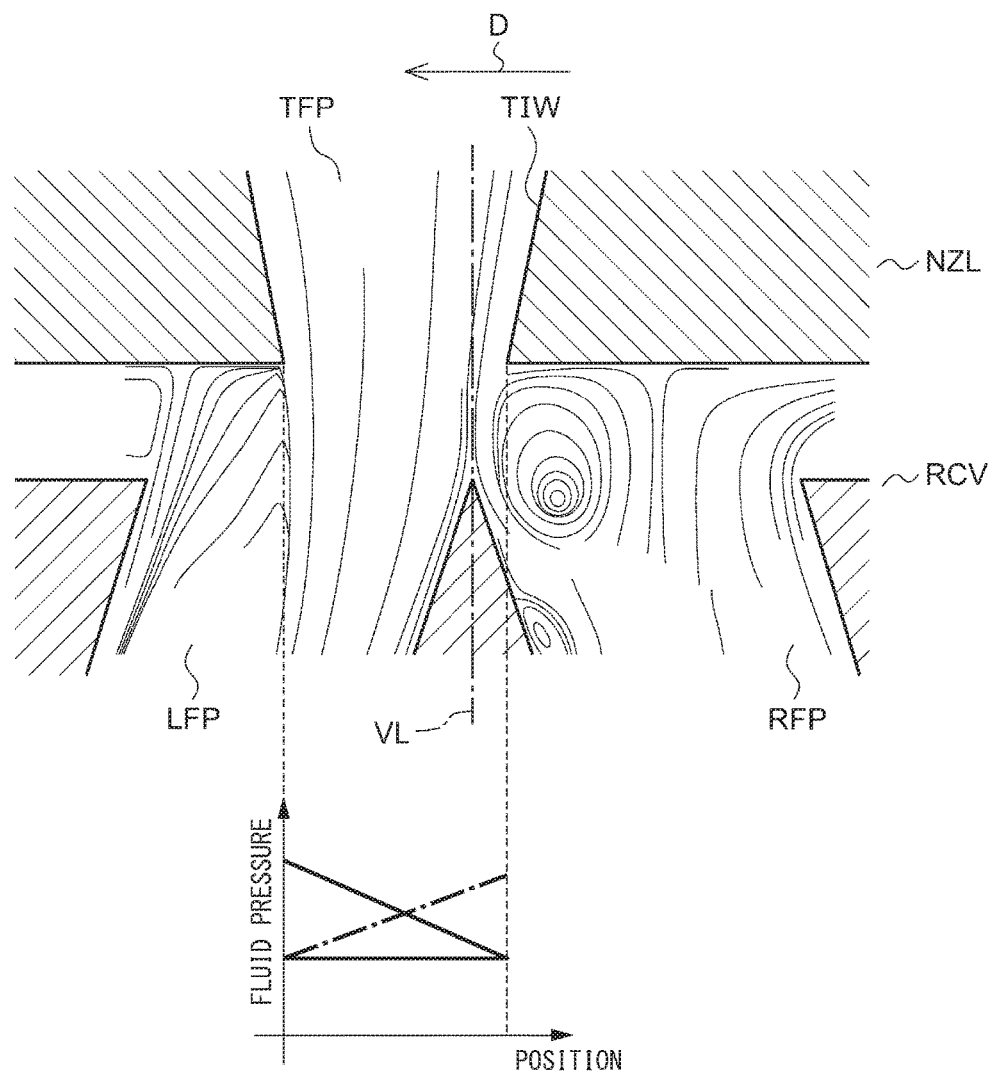
FIG. 11 is a diagram describing a relation between a flow force and a pressure gradient of a hydraulic fluid in the vicinity of a discharge port of a nozzle.

The flow force exerted on the nozzle increases in proportional to the pressure gradient expressed by the above-described expression (2). As shown in FIG. 11, a case in which the nozzle NZL moves in a direction indicated by an arrow D toward the left flow path LFP will be supposed. A graph of the pressure gradient of the hydraulic fluid in the vicinity of the discharge port is illustrated at the bottom of FIG. 11. As indicated by the one-dotted chain line of the graph of FIG. 11, the pressure of the hydraulic fluid increases from the left flow path LFP toward the right flow path RFP in the vicinity of the discharge port and in the case of the pressure gradient on the upside, the flow force is generated in a direction different from the arrow D. Accordingly, the movement of the nozzle NZL is inhibited. Meanwhile, as indicated by the solid line of the graph of FIG. 11, the pressure of the hydraulic fluid becomes uniform or in the case of the pressure gradient on the downside, the flow force of inhibiting the movement of the nozzle NZL can be controlled.

Here, it is assumed that the flow force FF exerted in a direction opposite to the movement direction of the nozzle NZL is proportional to the pressure gradient shown in the above-described expression (2) as indicated by the following expression (3).

Expression 3

$$\frac{FF}{\cos(\beta/2)} \propto \frac{\partial p}{\partial r} = \rho \omega^2 r = \rho \frac{v_\theta^2}{r} \quad (3)$$

The radius r of the flow line of the hydraulic fluid is expressed by the following expression (4) using a gap Lng between the surface facing the nozzle NZL and the inflow surface of the receiver RCV.

Expression 4

$$r = \frac{Lng}{\tan(\alpha/2 - \beta/4)} \qquad (4)$$

As shown in the following expression (5), since the flow force FF is inversely proportional to the radius r of the flow line of the hydraulic fluid, the following expression (6) holds. Further, the expression (7) is derived from the expression (6).

Expression 5

$$\frac{\partial p}{\partial r} \propto \frac{1}{r} = \frac{\tan(\alpha/2 - \beta/4)}{Lng} \qquad (5)$$

[Expression 6]

$$\frac{FF}{\cos(\beta/2)} \propto \frac{\tan(\alpha/2 - \beta/4)}{Lng} \qquad (6)$$

Expression 7

$$FF \propto \frac{\tan(\alpha/2 - \beta/4) \cdot \cos(\beta/2)}{Lng} \qquad (7)$$

FIG. 12 is a diagram illustrating a relation between an angle ratio β/α and a pressure gradient obtained from the above-described relational expression. FIG. 12 shows a pressure gradient of a hydraulic fluid directed from the left flow path LFP side to the right flow path RFP side when the nozzle NZL is moved toward the left flow path LFP, wherein the angles of inclination a of the flow path is 30°, 40°, 50°, and 60°. When the pressure gradient is larger than 0, the flow force FF increases. Further, the flow force FF decreases when the pressure gradient is zero or less. From the relation shown in FIG. 12, since the pressure gradient becomes zero or less when the angle ratio β/α is larger than 2, that is, the taper angle β of the nozzle is larger than twice the inclination angle α of the flow path, the flow force FF can be controlled. In such a configuration, since the flow force can be controlled, the nozzle easily moves and thus the response speed of the actuator is improved.

The principle of the above-described embodiments will be described based on a symmetrical structure with respect to the vertical line drawn on the nozzle at the neutral position. However, the servo-valve may have asymmetrical structure with respect to the vertical line. For example, the inclination angle of the left flow path with respect to the vertical line may be different from the inclination angle of the right flow path with respect to the vertical line.

The design principle described in various embodiments can be applied to various servo-valves and various fluidic devices. A part of various features described in one of various embodiments may be applied to the servo-valve and the fluidic device according to another embodiment.

An outline of an aspect of the invention is as follows. The servo-valve according to an aspect of the invention drives an actuator by using a fluid. The servo-valve includes a nozzle that includes a discharge edge forming an outline of a discharge port from which the fluid is discharged and a tapered inner wall growing narrower toward the discharge edge and a receiver that is provided with a flow path into which the fluid discharged from the discharge port flows. The nozzle is displaced in a second direction different from the fluid discharge direction. The flow path extension direction is inclined with respect to a direction orthogonal to the inflow surface facing the nozzle by an angle α. A taper angle determined by the tapered inner wall is larger than twice the angle α.

According to the above-described configuration, since the taper angle determined by the tapered inner wall is larger than twice the angle α, a component of the flow force exerted from the fluid to the tapered inner wall in the nozzle displacement direction decreases. Since nozzle is hardly affected by the fluid and displaced promptly, the servo-valve is operated at a high response speed to quickly drive an actuator.

In the above-described configuration, the flow path may include a first flow path and a second flow path arranged in the nozzle displacement direction. The first flow path and the second flow path may have different extension directions. The taper angle may be larger than a narrow angle between the first flow path and the second flow path.

According to the above-described configuration, since the taper angle is larger than a narrow angle between the first flow path and the second flow path, a component of the flow force exerted from the fluid to the tapered inner wall in the nozzle displacement direction decreases. Since nozzle is hardly affected by the fluid and displaced promptly, the servo-valve is operated at a high response speed to quickly drive an actuator.

In the above-described configuration, the servo-valve may further include a driving unit which drives the nozzle in the direction of the alignment line on which the first inflow port formed as the end of the first flow path and the second inflow port formed as the end of the second flow path are aligned. The driving unit may drive the nozzle to displace the nozzle on the alignment line from the neutral position in which the extended line extended in the fluid discharge direction from the center of the discharge port intersects the alignment line between the first inflow port and the second inflow port.

According to the above-described configuration, since the taper angle is larger than a narrow angle between the first flow path and the second flow path, a component of the flow force exerted from the fluid to the tapered inner wall in the direction along the alignment line decreases. Since the nozzle can be quickly displaced on the alignment line with little influence from the fluid, the servo-valve is operated at a high response speed to quickly drive an actuator.

In the above-described configuration, the tapered inner wall and the virtual plane enclosing the extended line and the alignment line may form a first straight line of intersection and a second straight line of intersection. When the nozzle is positioned at the neutral position, the extended line of the first line of intersection may extend inside the first inflow port and the extended line of the second line of intersection may extend inside the second inflow port.

According to the above-described configuration, since the extended line of the first line of intersection extends inside the first inflow port and the extended line of the second line of intersection extends inside the second inflow port, the taper angle of the tapered inner wall increases. Thus, a component of the flow force exerted from the fluid to the tapered inner wall in a direction along the alignment line decreases. Since nozzle is hardly affected by the fluid and displaced promptly, the servo-valve is operated at a high response speed to quickly drive an actuator.

In the above-described configuration, the taper angle may be the angle of intersection determined by the first line of intersection and the second line of intersection.

According to the above-described configuration, since the extended line of the first line of intersection extends inside the first inflow port and the extended line of the second line of intersection extends inside the second inflow port, the taper angle defined as the angle of intersection of the first line of intersection and the second line of intersection increases. Thus, a component of the flow force exerted from the fluid to the tapered inner wall in a direction along the alignment line decreases. Since nozzle is hardly affected by the fluid and displaced promptly, the servo-valve is operated at a high response speed to quickly drive an actuator.

In the above-described configuration, when the driving unit allows the extended line to move from the neutral position to the center of the first inflow port, the flow force derived from the fluid may become stronger on the first line of intersection than on the second line of intersection. When the driving unit allows the extended line to move from the neutral position to the center of the second inflow port, the flow force may become stronger on the second line of intersection than on the first line of intersection.

According to the above-described configuration, when the driving unit moves the extended line from the neutral position to the center of the first inflow port, the flow force derived from the fluid becomes stronger on the first line of intersection than on the second line of intersection. However, since the taper angle of the tapered inner wall is large, a component of the flow force in a direction along the alignment line decreases. When the driving unit allows the discharge direction to move close to the center of the second inflow port, the flow force becomes stronger on the second line of intersection than on the first line of intersection. However, since the taper angle of the tapered inner wall is large, a component of the flow force in a direction along the alignment line decreases. Since nozzle is hardly affected by the fluid and displaced promptly, the servo-valve is operated at a high response speed to quickly drive an actuator.

In the above-described configuration, the tapered inner wall and the virtual plane enclosing the extended line and the alignment line may form the first line of intersection and the second line of intersection. The tapered inner wall may be a curved surface formed so that the first line of intersection and the second line of intersection are curved. When the nozzle is positioned at the neutral position, the tangential line at the midpoint of the first line of intersection may extend inside the first inflow port and the tangential line at the midpoint of the second line of intersection may extend inside the second inflow port.

According to the above-described configuration, since the tangential line at the midpoint of the first line of intersection extends inside the first inflow port and the tangential line at the midpoint of the second line of intersection extends inside the second inflow port, the hydraulic fluid is appropriately guided to the first inflow port and/or the second inflow port. In addition, since the taper angle of the tapered inner wall increases, a component of the flow force exerted from the fluid to the tapered inner wall in a direction along the alignment line decreases. Since nozzle is hardly affected by the fluid and displaced promptly, the servo-valve is operated at a high response speed to quickly drive an actuator.

In the above-described configuration, the taper angle may be the angle of intersection of two tangential lines.

According to the above-described configuration, since the extended line of the first line of intersection extends inside the first inflow port and the extended line of the second line of intersection extends inside the second inflow port, the taper angle defined as the angle of intersection of two tangential lines increases. Thus, a component of the flow force exerted from the fluid to the tapered inner wall in a direction along the alignment line decreases. Since nozzle is hardly affected by the fluid and displaced promptly, the servo-valve is operated at a high response speed to quickly drive an actuator.

A servo-valve according to another aspect of the invention is a servo-valve that drives an actuator by using a fluid, including: a nozzle that includes a discharge edge forming an outline of a discharge port from which the fluid is discharged and a tapered inner wall growing narrower toward the discharge edge; a receiver that includes an inflow surface provided with a first inflow port into which a part of the fluid discharged from the discharge port flows and a second inflow port into which the rest of the fluid discharged from the discharge port flows; and a driving unit that drives the nozzle along an alignment line on which the first inflow port and the second inflow port are aligned. The driving unit drives the nozzle to displace the nozzle on the alignment line from a neutral position in which an extended line extended in the fluid discharge direction from the center of the discharge port intersects the alignment line between the first inflow port and the second inflow port. The tapered inner wall and a virtual plane enclosing the extended line and the alignment line form a first straight line of intersection and a second straight line of intersection. When the nozzle is positioned at the neutral position, the extended line of the first line of intersection extends inside the first inflow port and the extended line of the second line of intersection extends inside the second inflow port.

According to the above-described configuration, since the extended line of the first line of intersection extends inside the first inflow port and the extended line of the second line of intersection extends inside the second inflow port when the nozzle is positioned at the neutral position, the taper angle of the tapered inner wall increases. Thus, a component of the flow force exerted from the fluid to the tapered inner wall in a direction along the alignment line decreases. Since nozzle is hardly affected by the fluid and displaced promptly, the servo-valve is operated at a high response speed to quickly drive an actuator.

In the above-described configuration, the taper angle may be 90° or more.

According to the above-described configuration, since the taper angle is 90° or more, a component of the flow force exerted from the fluid to the tapered inner wall in the nozzle displacement direction decreases. Since nozzle is hardly affected by the fluid and displaced promptly, the servo-valve is operated at a high response speed to quickly drive an actuator.

In the above-described configuration, the servo-valve may further include a casing that is provided with a flow path through which the fluid flows. The casing may be provided with a first outflow port and a second outflow port. The driving unit may displace the nozzle along the alignment line to adjust the amount of the fluid flowing out of the first outflow port and the amount of the fluid flowing out of the second outflow port.

According to the above-described configuration, since the driving unit displaces the nozzle along the alignment line to adjust the amount of the fluid flowing out of the first outflow port and the amount of the fluid flowing out of the second outflow port, the designer can operate the actuator connected to the servo-valve by changing the outflow amounts of the first outflow port and the second outflow port.

A fluidic device according to still another aspect of the invention includes: the above-described servo-valve; and a movable piece that is displaced by the fluid inside a hollow portion communicating with the first outflow port and the second outflow port.

According to the above-described configuration, since the fluidic device includes the above-described servo-valve, the fluidic device can be operated at a high response speed.

The principle of the above-described embodiments is very suitably used in various devices obtaining a driving force from a fluid.

What is claimed is:

1. A servo-valve that drives an actuator by using a fluid, the servo-valve comprising:
    a nozzle that includes a discharge edge forming an outline of a discharge port from which the fluid is discharged and a tapered inner wall growing narrower toward the discharge edge; and
    a receiver that is provided with a flow path into which the fluid discharged from the discharge port flows,
    wherein the nozzle is structured to rotate around a rotation axis;
    wherein the nozzle is displaced in a direction different from a fluid discharge direction,
    wherein a flow path extension direction is inclined with respect to a direction orthogonal to an inflow surface facing the nozzle by an angle α, and
    wherein a taper angle determined by the tapered inner wall is larger than twice the angle α.

2. The servo-valve according to claim 1,
    wherein the flow path includes a first flow path and a second flow path that are arranged in the nozzle displacement direction,
    wherein the first flow path and the second flow path have different extension directions, and
    wherein the taper angle is larger than a narrow angle between the first flow path and the second flow path.

3. The servo-valve according to claim 2, further comprising:
    a driving unit that drives the nozzle in a direction along an alignment line on which a first inflow port formed as an end of the first flow path and a second inflow port formed as an end of the second flow path are aligned,
    wherein the driving unit drives the nozzle on the alignment line to displace the nozzle from a neutral position in which an extended line extended in the fluid discharge direction from a center of the discharge port is positioned between the first inflow port and the second inflow port.

4. The servo-valve according to claim 3,
    wherein the tapered inner wall and a virtual plane enclosing the extended line and the alignment line form a first straight line of intersection and a second straight line of intersection, and
    wherein when the nozzle is positioned at the neutral position, an extended line of the first line of intersection extends inside the first inflow port and an extended line of the second line of intersection extends inside the second inflow port.

5. The servo-valve according to claim 4,
    wherein the taper angle is an angle of intersection determined by the first line of intersection and the second line of intersection.

6. The servo-valve according to claim 4,
    wherein when the driving unit moves the extended line from the neutral position to a center of the first inflow port, a flow force derived from the fluid becomes stronger on the first line of intersection than on the second line of intersection, and
    wherein when the driving unit moves the extended line from the neutral position to a center of the second inflow port, the flow force becomes stronger on the second line of intersection than on the first line of intersection.

7. The servo-valve according to claim 3,
    wherein the tapered inner wall and a virtual plane enclosing the extended line and the alignment line form a first line of intersection and a second line of intersection,
    wherein the tapered inner wall is a curved surface which is formed so that the first line of intersection and the second line of intersection are curved, and
    wherein when the nozzle is positioned at the neutral position, a tangential line at a midpoint of the first line of intersection extends inside the first inflow port and a tangential line at a midpoint of the second line of intersection extends inside the second inflow port.

8. The servo-valve according to claim 7,
    wherein the taper angle is an angle of intersection of two tangential lines.

9. A servo-valve that drives an actuator by using a fluid, the servo-valve comprising:
    a nozzle that includes a discharge edge forming an outline of a discharge port from which the fluid is discharged and a tapered inner wall growing narrower toward the discharge edge;
    a receiver that includes an inflow surface provided with a first inflow port into which a part of the fluid discharged from the discharge port flows and a second inflow port into which the rest of the fluid discharged from the discharge port flows; and
    a driving unit structured to rotate the nozzle around a rotation axis and from alignment lines on which the center lines of the first inflow port and the second inflow port are aligned,
    wherein the driving unit drives the nozzle to displace the nozzle from a neutral position in which an extended line extended in the fluid discharge direction from a center of the discharge port intersects the alignment lines of the first inflow port and the second inflow port,
    wherein the tapered inner wall and a virtual plane enclosing the extended line and the alignment lines form a first straight line of intersection and a second straight line of intersection, and
    wherein when the nozzle is positioned at the neutral position, a first extended line of the first line of intersection extends inside the first inflow port and a second extended line of the second line of intersection extends inside the second inflow port.

10. The servo-valve according to any one of claim 1, wherein the taper angle is 90° or more.

11. The servo-valve according to any one of claim 3, further comprising:
    a casing that is provided with a flow path through which the fluid flows,
    wherein the casing is provided with a first outflow port and a second outflow port, and
    wherein the driving unit displaces the nozzle along the alignment line to adjust the amount of the fluid flowing out of the first outflow port and the amount of the fluid flowing out of the second outflow port.

12. A fluidic device comprising:
    the servo-valve according to claim 11; and
    a movable piece that is displaced by the fluid inside a hollow portion communicating with the first outflow port and the second outflow port.

* * * * *